United States Patent
Tomita et al.

(10) Patent No.: US 9,520,735 B2
(45) Date of Patent: Dec. 13, 2016

(54) STORAGE BATTERY CONTROL SYSTEM AND STORAGE BATTERY CONTROL METHOD

(71) Applicant: Hitachi, Ltd., Tokyo (JP)

(72) Inventors: Taminori Tomita, Kanagawa (JP); Yasuko Shiga, Kanagawa (JP); Yoshihito Nasu, Ibaraki (JP)

(73) Assignee: Hitachi, Ltd., Tokyo (JP)

( * ) Notice: Subject to any disclaimer, the term of this patent is extended or adjusted under 35 U.S.C. 154(b) by 928 days.

(21) Appl. No.: 13/669,853

(22) Filed: Nov. 6, 2012

(65) Prior Publication Data

US 2013/0300374 A1 Nov. 14, 2013

(30) Foreign Application Priority Data

Nov. 10, 2011 (JP) .................................. 2011-246554

(51) Int. Cl.
*H02J 7/00* (2006.01)
*H01M 10/44* (2006.01)
*H01M 10/42* (2006.01)

(52) U.S. Cl.
CPC .............. *H02J 7/007* (2013.01); *H01M 10/42* (2013.01); *H01M 10/441* (2013.01); *H01M 2010/4271* (2013.01); *H01M 2010/4278* (2013.01)

(58) Field of Classification Search
USPC ................................................. 320/134, 132
See application file for complete search history.

(56) References Cited

U.S. PATENT DOCUMENTS 6,034,507 A 3/2000 Ikawa et al.
2011/0313603 A1* 12/2011 Laberteaux et al. .......... 320/134

FOREIGN PATENT DOCUMENTS

| JP | 09-298806 | | 11/1997 |
| JP | 10-322924 | A | 12/1998 |
| JP | 2003-259696 | A | 9/2003 |
| JP | 2006-094649 | A | 4/2006 |
| JP | 2010-246211 | A | 10/2010 |

OTHER PUBLICATIONS

Japan Patent Office Notification of Reasons for Refusal on application 2011-246554 dispatched Jan. 14, 2014; 2 pages.

* cited by examiner

*Primary Examiner* — Robert Grant
(74) *Attorney, Agent, or Firm* — Foley & Lardner LLP

(57) ABSTRACT

A storage battery control system comprises multiple storage batteries disposed in a power grid, and a storage battery control apparatus. The storage battery control apparatus is communicably coupled to the multiple storage batteries and an energy management system. The storage battery control apparatus acquires storage battery information comprising a charging-discharging performance and a remaining capacity from each of the storage batteries, acquires power supply-demand prediction information showing a prediction of power supply and demand in a prescribed range from the energy management system, decides an individual charging-discharging rate for each of the storage batteries based on the storage battery information and the power supply-demand prediction information, and sends the decided individual charging-discharging rate to each of the storage batteries. Each of the storage batteries operates based on the individual charging-discharging rate received from the storage battery control apparatus.

12 Claims, 19 Drawing Sheets

FIG. 4

| Remaining capacity information | | |
|---|---|---|
| C100 | C101 | C102 |
| Storage battery ID | Remaining capacity (kWh) | SOC (%) |
| VT1 | 5 | 50 |
| VT2 | 8 | 50 |
| VT3 | 9 | 50 |
| VT4 | 5 | 50 |

T10

| Elapsed time and charging performance relationship | | | | | | | | | | |
|---|---|---|---|---|---|---|---|---|---|---|
| Elapsed time (h) | 1 | 2 | 3 | 4 | 5 | 6 | 7 | 8 | 9 | 10 |
| VT1 charging capability (kWh) | 5 | 0 | 0 | 0 | 0 | 0 | 0 | 0 | 0 | 0 |
| VT2 charging capability (kWh) | 4 | 4 | 0 | 0 | 0 | 0 | 0 | 0 | 0 | 0 |
| VT3 charging capability (kWh) | 3 | 3 | 3 | 0 | 0 | 0 | 0 | 0 | 0 | 0 |
| VT4 charging capability (kWh) | 1 | 1 | 1 | 1 | 1 | 0 | 0 | 0 | 0 | 0 |
| Total storage battery charging capability (kWh) | 13 | 8 | 4 | 1 | 1 | 0 | 0 | 0 | 0 | 0 |

T40

| Elapsed time and discharging performance relationship | | | | | | | | | | |
|---|---|---|---|---|---|---|---|---|---|---|
| Elapsed time (h) | 1 | 2 | 3 | 4 | 5 | 6 | 7 | 8 | 9 | 10 |
| VT1 discharging capability (kWh) | 5 | 0 | 0 | 0 | 0 | 0 | 0 | 0 | 0 | 0 |
| VT2 discharging capability (kWh) | 4 | 4 | 0 | 0 | 0 | 0 | 0 | 0 | 0 | 0 |
| VT3 discharging capability (kWh) | 3 | 3 | 3 | 0 | 0 | 0 | 0 | 0 | 0 | 0 |
| VT4 discharging capability (kWh) | 1 | 1 | 1 | 1 | 1 | 0 | 0 | 0 | 0 | 0 |
| Total storage battery discharging capability (kWh) | 13 | 8 | 4 | 1 | 1 | 0 | 0 | 0 | 0 | 0 |

FIG. 12

| Remaining capacity information ||| T10(4) |
|---|---|---|
| Storage battery ID (C100) | Remaining capacity (kWh) (C101) | SOC (%) (C102) |
| VT1 | 0+5 | 50 |
| VT2 | 16-1 | 94 |
| VT3 | 6-3 | 17 |
| VT4 | 8-1 | 70 |

FIG. 14

| Remaining capacity information ||| |
|---|---|---|
| C100 | C101 | C102 |
| Storage battery ID | Remaining capacity (kWh) | SOC (%) |
| VT1 | 0 | 0 |
| VT2 | 16-4 | 75 |
| VT3 | 6+3 | 50 |
| VT4 | 8+1 | 90 |

T10(5)

STORAGE BATTERY CONTROL SYSTEM AND STORAGE BATTERY CONTROL METHOD

BACKGROUND OF THE INVENTION

1. Field of the Invention

The present invention relates to a storage battery control system and a storage battery control method.

2. Description of the Related Art

Systems that couple multiple storage batteries to a power grid have been proposed in recent years. Although not related to a storage battery coupled to a power grid, a technology for supplying power to a common load using batteries of different types is known (Japanese Patent Application Laid-open No. 2010-246211). A technology for making effective use of electric power by feeding the surplus power of a secondary battery to a selected load, and, in addition, enhancing the soundness of the secondary battery is also known (Japanese Patent Application Laid-open No. H10-322924). In addition, although not related to a storage battery coupled to a power grid, a technology for mounting a storage battery having high output density and a storage battery having high energy density in an electric vehicle, and supplying power from either one of the storage batteries is known (Japanese Patent Application Laid-open No. H9-298806).

In order to stably and efficiently operate a power grid using multiple storage batteries coupled to the power grid, it is necessary to systematically control each storage battery based on a power supply-demand prediction. However, in Japanese Patent Application Laid-open No. 2010-246211 and Japanese Patent Application Laid-open No. H9-298806, the technologies do not individually control multiple storage batteries coupled to the power grid, and do not systematically control the charging and discharging of the storage batteries. Japanese Patent Application Laid-open No. H10-322924 is technology for maintaining the soundness of a certain specified secondary battery, and does not control the charging and discharging of multiple storage batteries to achieve stable and efficient operation of the power grid.

SUMMARY OF THE INVENTION

Consequently, an object of the present invention is to provide a storage battery control system and a storage battery control method, which make it possible to stably and efficiently operate a power grid by effectively utilizing multiple storage batteries installed in the power grid.

A storage battery control system related to the present invention for solving the above problems is a storage battery control system for controlling the operation of a storage battery coupled to a power grid, and comprises multiple storage batteries disposed in the power grid, and a storage battery control apparatus, which is for controlling the charging and discharging of the multiple storage batteries and is communicably coupled to both the multiple storage batteries and an energy management system, wherein the storage battery control apparatus acquires storage battery information comprising a charging-discharging performance and a remaining capacity from each storage battery, acquires power supply-demand prediction information showing a prediction of power supply and demand in a prescribed range from the energy management system, which manages the power supply and demand in the prescribed range, decides an individual charging-discharging rate for each storage battery based on the storage battery information and the power supply-demand prediction information, and sends the decided individual charging-discharging rate to each storage battery, and each storage battery operates on the basis of the individual charging-discharging rate received from the storage battery control apparatus.

The charging-discharging performance may comprise a charging performance, which shows charging rate per unit of time, a discharging performance, which shows discharging rate per unit of time, and a full charge capacity.

The energy management system, based on a power consumption of a customer, who exists within a prescribed range, can predict power demand within the prescribed range during a prescribed time period, which is configured longer than the unit of time, and based on the predicted power demand, can calculate a total charging-discharging rate needed for the storage batteries as a whole, include the calculated total charging-discharging rate in the power supply-demand prediction information, and send this information to the storage battery control apparatus.

The energy management system can also calculate load prediction information showing a trend of a change in the power demand based on the predicted power demand, include the calculated load prediction information in the power supply-demand prediction information, and send this information to the storage battery control apparatus.

The storage battery control apparatus, based on the load prediction information received from the energy management system, can determine a mode to be either a balanced mode in which the power demand and the power supply are balanced, a discharging performance priority mode in which the power demand is greater than the power supply, or a charging performance priority mode in which the power supply is greater than the power demand, and based on the determined mode, can also select a control pattern for deciding the individual charging-discharging rate for each storage battery.

The storage battery control apparatus, in the case of the balanced mode, selects a balanced control pattern for deciding the individual charging-discharging rate that allows the remaining capacity of each storage battery to approach half of the full charge capacity of the relevant storage battery, in the case of the discharging performance priority mode, selects a discharge control pattern for deciding the individual charging-discharging rate that allows charging from a low-discharging-performance storage battery of the respective storage batteries to a high-discharging-performance storage battery of the respective storage batteries, and in the case of the charging performance priority mode, selects a charge control pattern for deciding the individual charging-discharging rate that allows charging from a high-charging-performance storage battery of the respective storage batteries to a low-charging-performance storage battery of the respective storage batteries.

The storage battery control apparatus, in a case where there exist multiple control pattern candidates, may select any one of the candidates as the control pattern based on a prescribed selection criterion.

At least a portion of the configuration of the present invention should be able to be realized as either a computer program or a hardware circuit. The computer program, for example, can be delivered via a communication medium such as the Internet, or a recording medium such as a hard disk or a flash memory device.

BRIEF DESCRIPTION OF THE DRAWINGS

FIG. 4 shows a configuration of remaining capacity information;

FIG. 12 shows changes in the remaining capacity information after executing a discharging performance priority mode control pattern;

FIG. 14 shows changes in the remaining capacity information after executing a charging performance priority mode control pattern;

DESCRIPTION OF THE PREFERRED EMBODIMENTS

Figure 1:
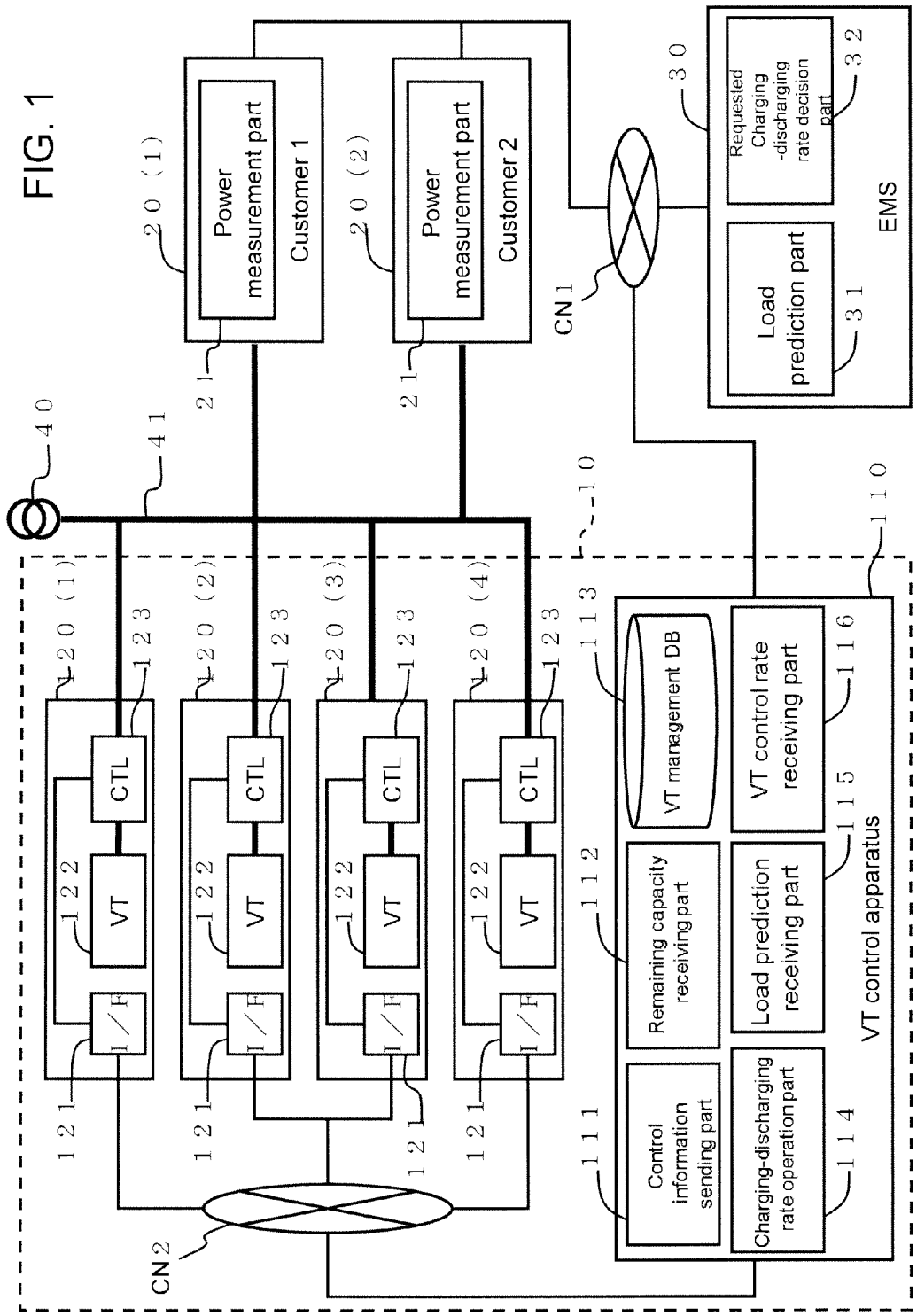
FIG. 1 is a block diagram of an entire storage battery control system.

An embodiment of the present invention will be explained by referring to the drawings. The battery control system of the embodiment, as described hereinbelow, comprises an energy management system 30 for providing power grid supply-demand prediction information, multiple charge-discharge controllable storage batteries 120, which are coupled to the power grid, and a storage battery control apparatus 110 for controlling the charging and discharging of a storage battery. There may be cases in which a storage battery is abbreviated as either "VT" or "battery" in the drawings, or is omitted from the drawings.

The storage battery control apparatus receives supply-demand prediction information from the energy management system, and, in addition, receives storage battery information from each storage battery. The storage battery control apparatus instructs each storage battery to perform charging and discharging based on a control pattern corresponding to a power demand prediction.

In accordance with this, the embodiment systematically charges and discharges each storage battery by matching the charging-discharging performance of each storage battery with the power supply-demand prediction. That is, the remaining capacity in each storage battery is adjusted in accordance with the power supply-demand prediction.

Therefore, in a case where a lot of discharging is required, the energy stored in the storage battery can be rapidly supplied to the power grid. In contrast, in a case where a lot of charging is required, the surplus power from the power grid can be rapidly stored in the storage battery. In a case where the power supply and demand are in balance, the power supply-demand balance can be maintained as much as possible by adjusting the SOC (State Of Charge) of the storage battery to near 50% beforehand.

Thus, according to the embodiment, since storage batteries can be effectively utilized by systematically adjusting the remaining capacity in each storage battery, it is possible to operate a power grid stably and efficiently. The embodiment will be explained in detail hereinbelow.

Example 1

Example 1 will be explained by referring to FIGS. 1 through 15. FIG. 1 shows the overall configuration of a low-voltage grid-side power control system, which comprises a storage control system 10. This power control system, for example, can comprise at least one storage battery control system 10, multiple customers 20(1), 20(2), at least one energy management system 30, at least one pole transformer 40, and at least one low voltage-side power grid 41.

Multiple customers (20(1) and 20(2)) and multiple storage batteries 120(1), 120(2), 120(3) and 120(4) are coupled to the low voltage-side power grid (distribution line) 41 emanating from the pole transformer 40. When no particular distinction is made, the storage batteries 120(1) through 120(4) may be called storage battery 120.

The customers 20(1) and 20(2), for example, are an ordinary private residence, a multi-unit housing complex, a commercial facility, a hospital, and so forth. When no particular distinction needs to be made, the customers 20(1) and 20(2) may be called customer 20. The customer 20, for example, has various types of electrical loads that consume power, such as an electrical lighting system, an air conditioning system, a hot-water heater, and a passenger conveyance system. In addition, for example, the customer 20 can also be equipped with a power generation apparatus, such as a solar power generation system and a wind turbine power generation system.

The power consumption (and power output) of the customer 20 is measured at prescribed periods using a power measurement part 21. The power measurement part 21 sends measured power consumption information to the energy management system 30 via a communication network CN1. The communication network CN1, for example, is configured using either one or multiple of a wireless communication network, a communication network, which uses power lines, the Internet, and a local area network (LAN).

The energy management system 30 is for managing power supply and demand in a prescribed range. The energy management system 30 is configured as a computer comprising a microprocessor and a memory. A load prediction part 31 and a requested charging-discharging rate decision part 32 are both realized by the microprocessor executing a prescribed computer program stored in the memory.

The load prediction part 31 creates load prediction information showing a prediction of the load (power demand) in the future based on a history of the power consumption of the customer 20. Although various load prediction methods are conceivable, for example, it is possible to predict the power consumption of a corresponding time based on an average value of power consumptions measured at the same times on the same days in the past. In addition, power consumption can also be predicted by referring to power consumption historical data, and past meteorological data and weather forecasts.

The load prediction information of this example comprises information for determining whether "the load tends to increase", "the load tends to decrease", or "the load tends to maintain current state". The load prediction information, for example, may comprise symbols or alphanumerics, which directly denote a variation trend such as "−", "+", or "0". The load prediction information, for example, may comprise both a load variation trend and variation quantity, such as "−20%", "+15%", and "±0".

The load is the power demand in a prescribed range (the total value of the power consumption of the respective customers 20). As described below, in a case where the load tends to increase, the remaining capacity of the storage battery 120 is adjusted beforehand in preparation for an increase in load. In a case where the load tends to decrease, the remaining capacity of the storage battery 120 is adjusted beforehand in preparation for a decrease in load. In a case where the load tends to maintain the current state, the remaining capacity of the storage battery 120 is adjusted beforehand to maintain this balance as much as possible.

The storage battery requested charging-discharging rate decision part (the requested charging-discharging rate decision part in the drawing) 32 is a function for deciding either the charging rate or the discharging rate requested for the multiple storage batteries 120 as a whole. This part will be called the requested charging-discharging rate decision part 32 hereinafter.

The requested charging-discharging rate decision part 32 decides the requested charging-discharging rate for all the storage batteries 120 based on the load prediction information created by the load prediction part 31 and the power consumption of the respective customers 20 measured by the power measurement part 21. The decided requested charging-discharging rate is sent to the storage battery control apparatus 110 via the communication network CN1.

As explained above, the requested charging-discharging rate is the value requested for the multiple storage batteries 120 as a whole, and is equivalent to a "total charging-discharging rate". That is, the requested charging-discharging rate is either the charging rate or the discharging rate requested for one virtual storage battery, which comprises multiple storage batteries 120.

An example of a method for deciding the requested charging-discharging rate will be explained. For example, a target value for the power demand (load) on the pole transformer 40 is configured, and the difference between the target value and the total value of the power consumption of the respective customers 20 is used as either the charging rate or the discharging rate for the storage batteries 120 as a whole.

That is, in a case where the total demand of the pole transformer 40 low voltage-side grid (distribution lines) 41 is larger than the target value (target load), power is supplied to the low voltage-side grid 41 from any one or multiple of the storage batteries 120. Alternatively, in a case where the total demand on the low voltage-side grid is smaller than the target value, the surplus power of the low voltage-side grid 41 is stored in any one or multiple of the storage batteries 120.

The configuration of the storage battery control system 10 will be explained. The storage battery control system 10 comprises multiple storage batteries 120(1) through 120(4), which are coupled to the low voltage-side grid 41, and a storage battery control apparatus (VT control apparatus in the drawing) 110, which is coupled to these storage batteries 120(1) through 120(4) via a communication network CN2.

Four storage batteries 120(1) through 120(4) are shown in the drawing, but the configuration may be such that two, three, five or more storage batteries are disposed in the storage battery control system 10. In this example, a case in which the storage batteries 120(1) through 120(4) are storage batteries having respectively different electrical characteristics will be explained. However, this example can also apply to a case in which the electrical characteristics of the storage batteries 120(1) through 120(4) are the same.

In this example, the electrical characteristics of the storage batteries 120(1) through 120(4) are different, but the basic configuration is shared in common. Accordingly, the storage batteries 120(1) through 120(4) will be called storage battery 120. Each storage battery 120, for example, comprises a communication part 121, a storage battery main unit 122, and a charge-discharge control part 123.

The communication part (I/F in the drawing) 121 is a circuit for communicating with the storage battery control apparatus 110 via the communication network CN2. The communication network CN2 is for communications between the storage batteries 120 and the storage battery control apparatus 110, and, for example, can be configured using either any one or multiple of a wireless communication network, a power line communications (PLC), and the Internet. The communication part 121 receives a charge-discharge control signal, which will be explained further below, from the storage battery control apparatus 110 via the communication network CN2. The communication part 121 delivers the received charge-discharge control signal to the charge-discharge control part 123. In addition, the communication part 121 can also send the remaining capacity and the like, which will be explained further below, to the storage battery control apparatus 110 via the communication network CN2.

The storage battery main unit 122 is configured by coupling together multiple cells comprising electrodes and an electrolyte. The storage battery main unit 122, for example, can comprise a lithium ion storage battery, a lead storage battery, a nickel hydride storage battery, and a sodium-sulfur storage battery. In addition, the storage battery 120 may comprise a capacitor such as an electric double-layer capacitor, in addition to the storage battery main unit 122.

The charge-discharge control part 123 is a control circuit for controlling charging to the storage battery main unit 122 and discharging from the storage battery main unit 122. The charge-discharge control part 123, for example, can comprise an inverter circuit and a microcomputer circuit.

At charging time, the charge-discharge control part 123 charges the storage battery main unit 122 by converting alternating current power from the power grid 41 to direct current power. At discharging time, the charge-discharge control part 123 converts the direct current power of the storage battery main unit 122 to alternating current power and supplies the alternating current power to the power grid 41.

The charge-discharge control part 123 either charges or discharges the storage battery main unit 122 in accordance with a charge-discharge control signal received from the storage battery control apparatus 110. The charge-discharge control part 123 manages the remaining capacity of the storage battery main unit 122 (current remaining capacity).

The charge-discharge control part 123 can send the remaining capacity to the storage battery control apparatus 110 on either a regular or irregular basis.

The configuration of the storage battery control apparatus 110 will be explained. The storage battery control apparatus 110 individually controls the charging and discharging of each storage battery 120 based on a power supply-demand state of the power grid. The storage battery control apparatus 110 can be configured as a computer apparatus comprising a microprocessor and a memory. The storage battery control apparatus 110 may be integrated with the energy management system 30.

The storage battery control apparatus 110, for example, may be installed in a charging station or the like. The charging station comprises multiple storage batteries 120, and is a facility for supplying power to a prescribed region and for storing surplus power created by a prescribed region.

The storage battery control apparatus 110 microprocessor realizes the following functions 111 through 116 by executing a prescribed computer program stored in the memory.

A remaining capacity receiving part 112 receives the remaining capacity sent from each storage battery 120. The received remaining capacity is stored in a storage battery management database (VT management DB in the drawing) 113.

The remaining capacity receiving part 112 can receive the remaining capacity from each storage battery 120 with respect to a prescribed period, and can update the storage battery management DB 113. Or, the configuration may be such that, in a case where the latest remaining capacity is needed, the remaining capacity receiving part 112 requests that the remaining capacity be sent from the storage battery control apparatus 110 to each storage battery 120.

A load prediction receiving part 115 receives load prediction information sent from the load prediction part 31 of the energy management system 30.

A storage battery control rate receiving part 116 receives the requested charging-discharging rate information sent from the requested charging-discharging rate decision part 32 of the energy management system 30. The requested charging-discharging rate information comprises information on either the charging rate or the discharging rate requested for all of the storage batteries 120, which are the control targets of the storage battery control apparatus 110, and information on a future load prediction.

The storage battery management database 113 stores information, which shows the remaining capacity of each storage battery 120, and information, which shows the charging-discharging performance of each storage battery 120.

A charging-discharging rate operation part 114 calculates the individual charging-discharging rate of each storage battery 120. The charging-discharging rate operation part 114 calculates the individual charging-discharging rate of each storage battery 120 based on the remaining capacity information of each storage battery 120, the charging-discharging performance information of each storage battery 120, and the requested charging-discharging rate information and load prediction information sent from the energy management system 30. An individual charging-discharging rate, which is the operation result thereof, is delivered to a control information sending part 111. The individual charging-discharging rate can be called the charge-discharge control capacity since it is a control capacity for controlling the charging and discharging of each storage battery 120.

The control information sending part 111 converts the charging-discharging rate (charge-discharge control capacity) created for each storage battery 120 to a charge-discharge control signal, and sends this signal to each storage battery 120.

Remaining capacity information T10 and charging-discharging performance information T20, which are stored in the storage battery management database 113, will be explained here be referring to FIGS. 4 and 5.

FIG. 4 shows an example of the remaining capacity information T10. The remaining capacity information T10, for example, correspondingly manages a battery ID C100, a remaining capacity C101, and a SOC C102. The remaining capacity information T10 of FIG. 4 shows the state in a case where the SOC of each storage battery 120 is 50%.

The battery ID C100 is information for identifying the respective storage batteries 120. It is preferable that each storage battery 120 in the storage battery control system 10 be able to be uniquely identified. The remaining capacity C101 is information showing the amount of electrical energy stored in a storage battery 120. The SOC C102 is information showing the charge ratio of the storage battery 120. The SOC can be determined using a value obtained by dividing the remaining capacity by the full charge capacity (SOC= (remaining capacity/full charge capacity)×100%).

For example, a look at the storage battery 120(1) shown as "VT 1" in the drawing clearly shows that the remaining capacity is 5 kWh and the SOC is 50%. A look at the storage battery 120(2) shown as "VT 2" in the drawing clearly shows that the remaining capacity is 8 kWh and the SOC is 50%. A look at the storage battery 120(3) shown as "VT 3" in the drawing clearly shows that the remaining capacity is 9 kWh and the SOC is 50%. A look at the storage battery 120(4) shown as "VT 4" in the drawing clearly shows that the remaining capacity is 5 kWh and the SOC is 50%.

Figure 5:
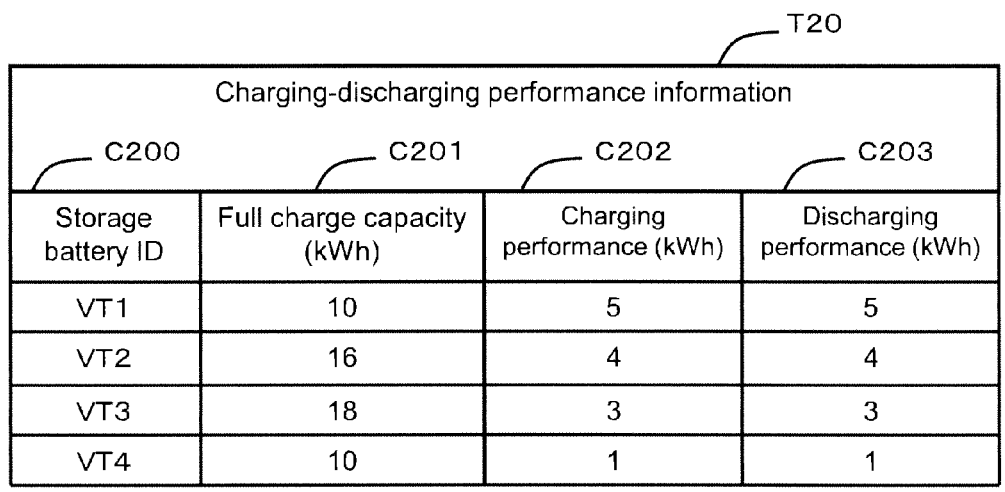
FIG. 5 shows a configuration of charging-discharging performance information.

An example of the charging-discharging performance information T20 is shown in FIG. 5. The charging-discharging performance information T20 manages the charging performance and the discharging performance of each storage battery 120. The charging-discharging performance information T20, for example, correspondingly manages a battery ID C200, a full charge capacity C201, a charging performance C202, and a discharging performance C203.

The full charge capacity C201 is information showing the maximum value of the battery capacity. The charging performance C202 is information showing the amount of electrical energy (kWh) capable of being charged per unit of time. The discharging performance C203 is information showing the amount of electrical energy (kWh) capable of being discharged per unit of time.

A look at the storage battery 120(1) clearly shows that the full charge capacity thereof is 10 kWh, the charging performance is 5 kWh, and the discharging performance is 5 kWh. Similarly, a look at the storage battery 120(2) therebelow clearly shows that the full charge capacity is 16 kWh, the charging performance is 4 kWh, and the discharging performance is 4 kWh. A looking at the storage battery 120(3) clearly shows that the full charge capacity is 18 kWh, the charging performance is 3 kWh, and the discharging performance is 3 kWh. A look at the storage battery 120(4) clearly shows that the full charge capacity is 10 kWh, the charging performance is 1 kWh, and the discharging performance is 1 kWh.

Figure 2:
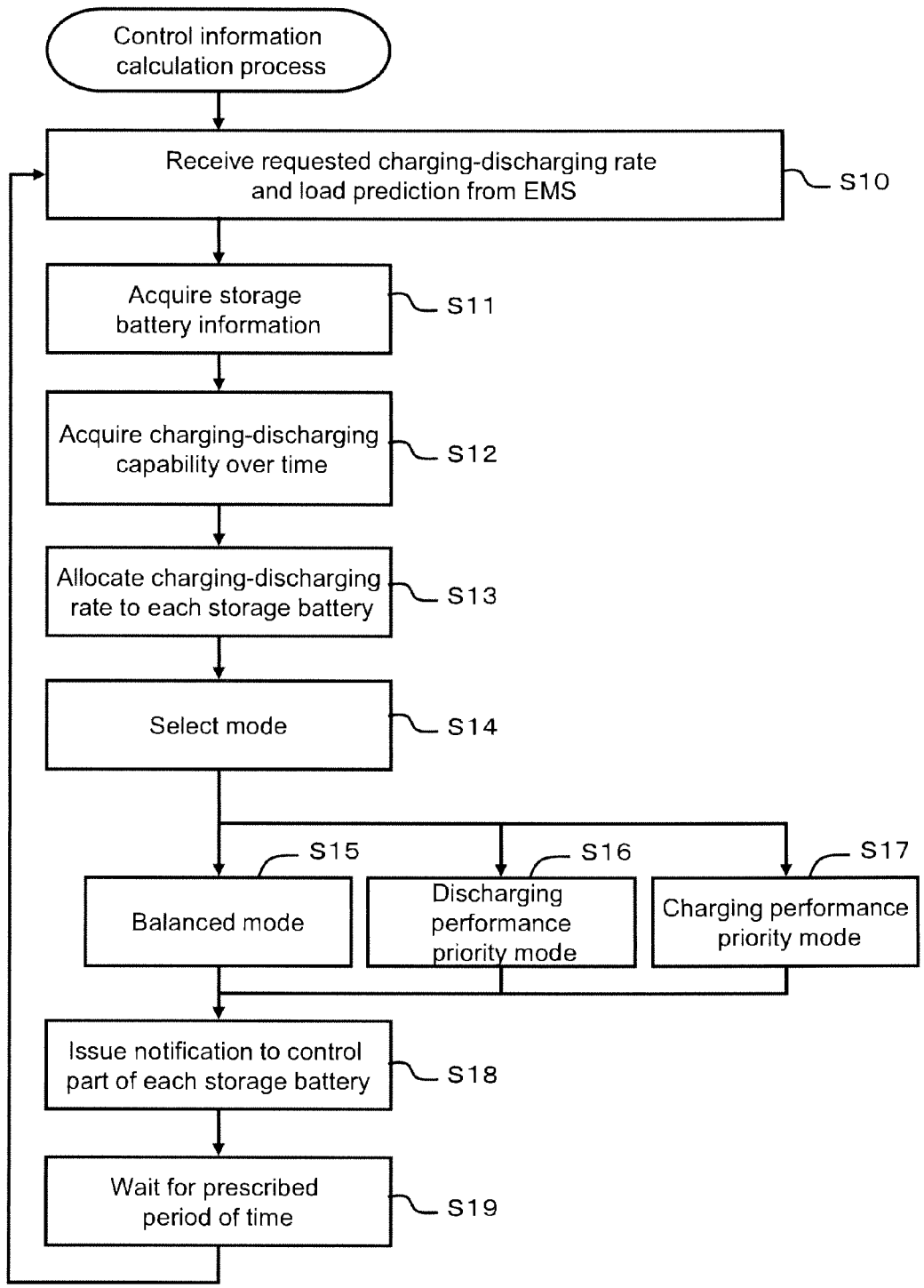
FIG. 2 is a flowchart of a storage battery control process.
Figure 3:
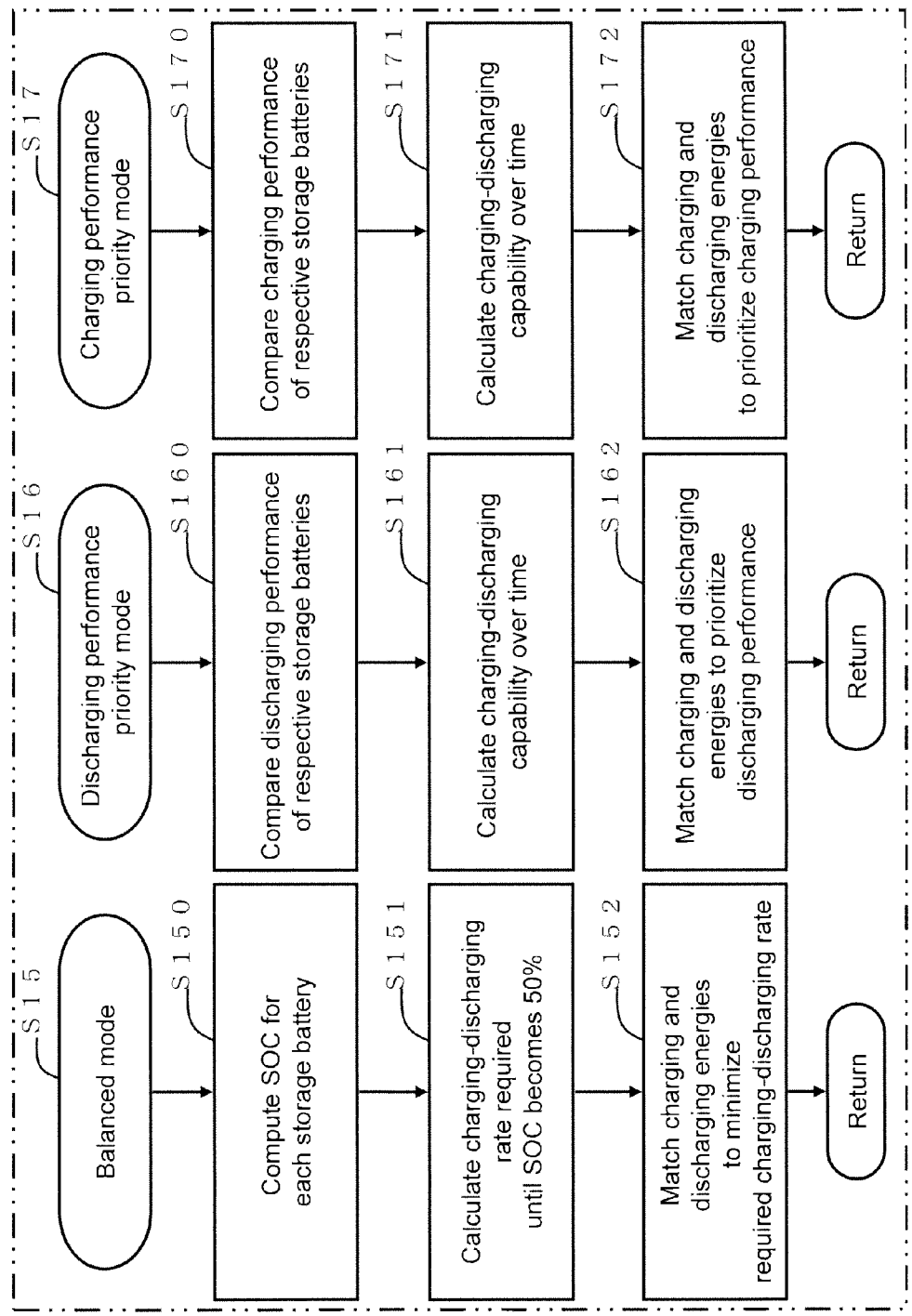
FIG. 3 shows a portion of the flowchart of FIG. 2 in detail.

A control information calculation process for creating a charge-discharge control signal will be explained by referring to the flowcharts of FIGS. 2 and 3. The processing of FIGS. 2 and 3 is primarily executed by the charging-discharging rate operation part 114. The control information calculation process will be explained by giving an example of a case in which the control cycle of the storage battery 120 is one hour. The control cycle may be shorter than one hour or longer than one hour. In the case of a control cycle other than one hour, the following processing may be implemented by converting the control cycle to the amount of electrical energy capable of being charged and discharged in this control cycle.

The charging-discharging rate operation part 114 first acquires the requested charging-discharging rate information from the energy management system 30 (S10). The requested charging-discharging rate information comprises the amount of electrical energy, which must be either charged to or discharged from all the storage batteries 120 managed by the storage battery control apparatus 110, and the load prediction information.

The charging-discharging rate operation part 114 acquires the storage battery information of each storage battery 120 from the storage battery management DB 113. The storage battery information comprises the remaining capacity information T10 and the charging-discharging performance information T20 (S11). That is, the storage battery information comprises the full charge capacity, the discharging performance, the charging performance, and the remaining capacity of each storage battery 120.

The charging-discharging rate operation part 114 respectively calculates the charging capability and the discharging capability, which correspond to an elapsed time from the current time, based on the remaining capacity, and discharging performance and charging performance of each storage battery 120 (S12). The charging capability corresponding to an elapsed time is information showing how the charging capability (charging performance) will change over the course of time from the current time. Similarly, the discharging capability corresponding to an elapsed time is information showing how the discharging capability (discharging performance) will change over the course of time from the current time.

Figure 8:
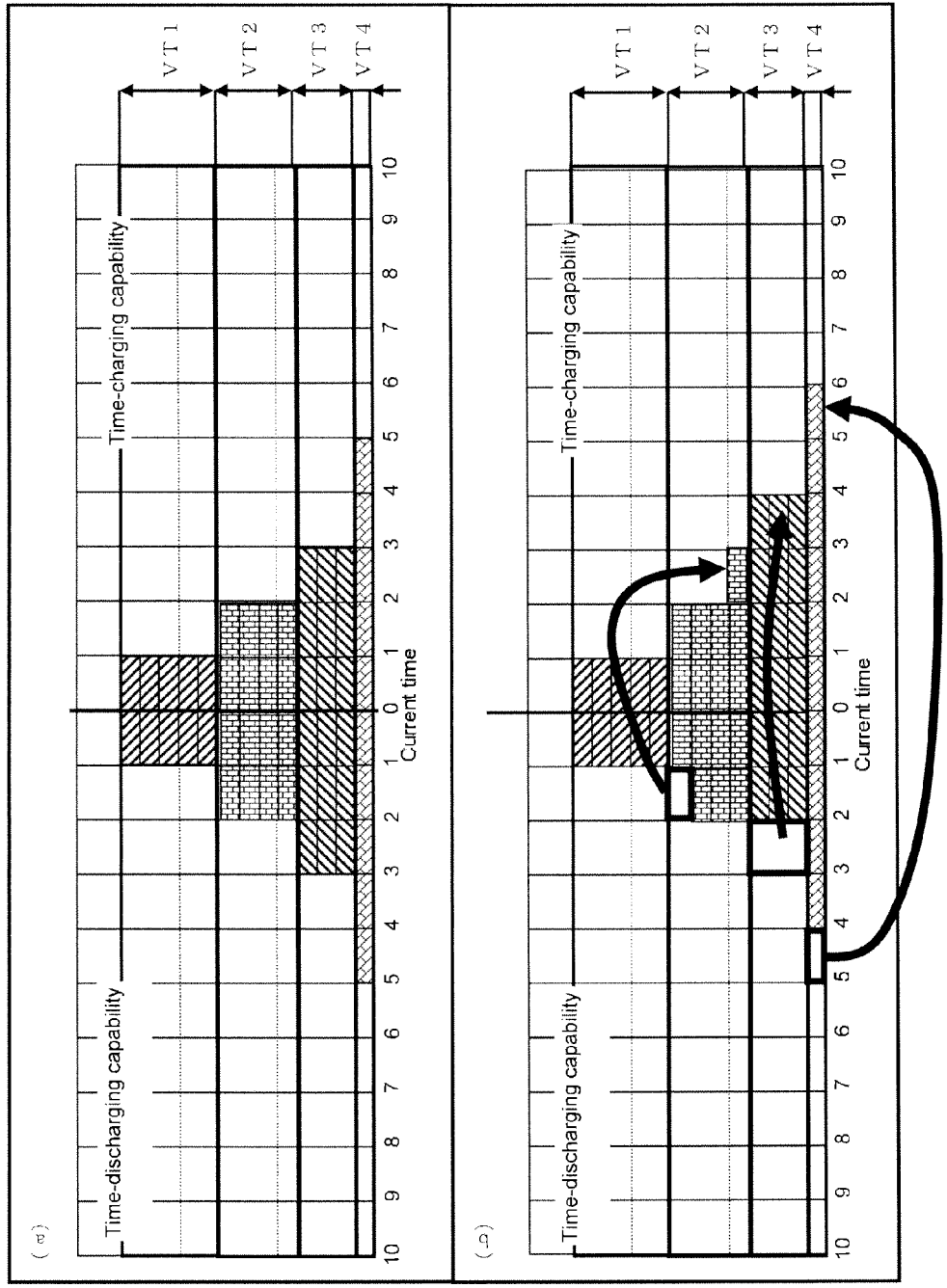
FIG. 8 is a graph showing changes over time in the charging-discharging performance of a storage battery.

The charging capability corresponding to an elapsed time is shown in FIG. 8 as a "time-charging capability" graph. Similarly, the discharging capability corresponding to elapsed time is shown in FIG. 8 as a "time-discharging capability" graph.

The charging-discharging rate operation part 114 respectively calculates the total value of the charging capability per time period and the discharging capability per time period by adding the charging capability and the discharging capability of each storage battery 120 to each control cycle.

The charging capability per time period and the discharging capability per time period are for calculating how much charging and discharging are possible when the charging-discharging performance of the storage battery 120 is displayed to the utmost at the current remaining capacity for each control cycle time period.

Figure 6:
FIG. 6 is a table showing a relationship between a time and charging performance.
Figure 7:
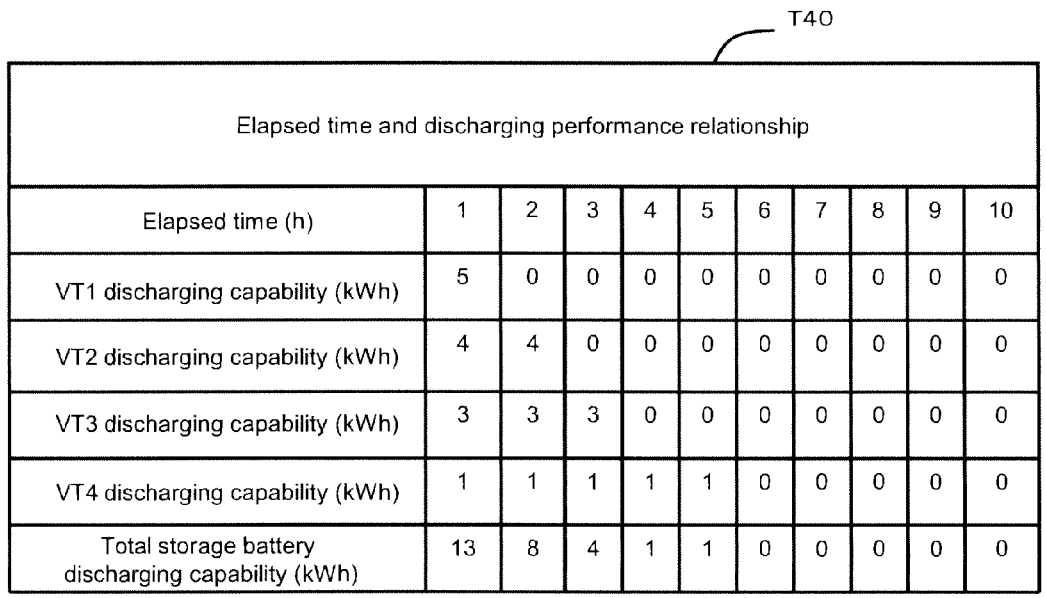
FIG. 7 is a table showing a relationship between a time and discharging performance.

A storage battery 120 comprising the charging-discharging performance shown in FIG. 5 will be explained by giving as an example a case having the remaining capacity shown in FIG. 4. FIG. 6 is a table T30 showing how the charging capability per unit of time changes over time. FIG. 7 is a table T40 showing how the discharging capability per unit of time changes over time.

The charging capability per period of time of the storage battery 120(1) changes as shown in FIG. 6. That is, the storage battery 120(1), in accordance with its charging performance, is able to charge 5 kWh of electrical energy in the first one hour period. When 5 kWh are charged in a state in which the remaining capacity is 5 kWh, the remaining capacity reaches 10 kWh, transitioning to the full charge capacity. Therefore, after the first one hour period has elapsed, the energy capable of being charged to the storage battery 120(1) becomes 0 kWh.

Similarly, look at the storage battery 120(2) therebelow. The remaining capacity of the storage battery 120(2) is 8 kWh, 4 kWh of energy is charged in the first one hour period, and 4 kWh of energy is charged in the next one hour period. The result is that the remaining capacity of the storage battery 120(2) reaches 16 kWh, which is the full charge capacity. Therefore, in the third one hour period and beyond, it becomes impossible to charge the storage battery 120(2).

Look at the storage battery 120(3). The remaining capacity of the storage battery 120(3) is 9 kWh, and, in accordance with its charging performance, 3 kWh of energy is charged in the first one hour period. In the second and third one hour periods, 3 kWh of energy each are charged to the storage battery 120(3). The result is that the remaining capacity of the storage battery 120(3) reaches 18 kWh, which is the full charge capacity. Therefore, in the fourth one hour period and beyond, it becomes impossible to charge the storage battery 120(3).

Look at the storage battery 120(4). The remaining capacity of the storage battery 120(4) is 5 kWh, and, in accordance with its charging performance, 1 kWh of energy is charged in the first one hour period. In the second, third, fourth, and fifth one hour periods, 1 kWh of energy each is charged to the storage battery 120(4). The result is that the remaining capacity of the storage battery 120(4) reaches 10 kWh, which is the full charge capacity. Therefore, in the sixth one hour period and beyond, it becomes impossible to charge the storage battery 120(4).

When the charging rate of each of the respective units of time (control cycles) are totaled, the first one hour period is 13 kWh, the second one hour period is 8 kWh, the third one hour period is 4 kWh, the fourth one hour period is 1 kWh, and the fifth one hour period is 1 kWh. The total value of the charging rate in the sixth one hour period and beyond is 0 kWh.

The change in discharging capability per unit of time will be explained by referring to FIG. 7. FIG. 7 was created having the values shown in FIGS. 4 and 5 as preconditions.

Look at the storage battery 120(1). The remaining capacity of the storage battery 120(1) is 5 kWh, and the discharging capability is 5 kWh. Since 5 kWh of energy is discharged in the first one hour period, the remaining capacity of the storage battery 120(1) becomes 0 kWh. Therefore, the storage battery 120(1) is unable to discharge in the second one hour period and beyond.

Look at the storage battery 120(2). The remaining capacity of the storage battery 120(2) is 8 kWh, and the discharging capability is 4 kWh. The storage battery 120(2) discharges 4 kWh of energy in the first one hour period, and discharges 4 kWh of energy in the subsequent second one hour period. At this point in time, the remaining capacity of the storage battery 120(2) becomes 0 kWh. Therefore, the storage battery 120(2) is unable to discharge in the third one hour period and beyond.

Look at the storage battery 120(3). The remaining capacity of the storage battery 120(3) is 9 kWh, and the discharging capability is 3 kWh. The storage battery 120(3) discharges 3 kWh of energy in the first one hour period, and discharges 3 kWh of energy each in the second and third one hour periods. At the point in time when the third one hour period ends, the remaining capacity of the storage battery 120(3) is 0 kWh. Therefore, the storage battery 120(3) is unable to discharge in the fourth one hour period and beyond.

Look at the storage battery 120(4). The remaining capacity of the storage battery 120(4) is 5 kWh, and the discharging capability is 1 kWh. The storage battery 120(4) discharges 1 kWh of energy each in the first through the fifth one hour periods. At the point in time when the fifth one hour period ends, the remaining capacity of the storage battery 120(4) is 0 kWh. Therefore, the storage battery 120(4) is unable to discharge in the sixth one hour period and beyond.

When the discharging rate of each of the respective units of time (control cycles) are totaled, the first one hour period is 13 kWh, the second one hour period is 8 kWh, the third one hour period is 4 kWh, the fourth one hour period is 1 kWh, and the fifth one hour period is 1 kWh. The total value of the charging rate in the sixth one hour period and beyond is 0 kWh.

FIG. 8A displays the numerals of table T30 of FIG. 6 and table T40 of FIG. 7 in graph form. The vertical axis of FIG. 8 shows the charging-discharging energy, and one division of the scale shows 1 kW. The horizontal axis of FIG. 8 shows the elapsed time from a current time, and one division of the scale shows one hour. The center of the horizontal axis shows the current time, and the elapsed time is shown in both the right and left directions. The region to the right side of the current time shows changes over time in charging capability, and corresponds to the table T30 of FIG. 6. The region to the left side of the current time shows changes over time in discharging capability, and corresponds to the table T40 of FIG. 7.

The topmost region of the graph is a first storage battery display region showing the changes over time in charging and discharging related to the storage battery 120(1). The next region is a second storage battery display region showing the changes over time in charging and discharging related to the storage battery 120(2). The next region after that is a third storage battery display region showing the changes over time in charging and discharging related to the storage battery 120(3). The next region after that is a fourth storage battery display region showing the changes over time in charging and discharging related to the storage battery 120(4).

Return to the flowchart of FIG. 2. The charging-discharging rate operation part 114 drafts a control plan (control pattern) for allocating the requested charging-discharging rate acquired in Step S10 to each storage battery 120 (S13).

Although various allocation methods are conceivable, for example, the requested charging-discharging rate is allocated in order from the storage battery having the lowest charging-discharging performance. Generally speaking, a storage battery has a technical feature whereby deterioration occurs as charging and discharging are performed repeatedly. In addition, a higher performance storage battery is generally expensive, and a lower performance storage battery is generally inexpensive.

In this example, as shown in the table T20 of FIG. 5, the first storage battery 120(1) features the highest performance, the second storage battery 120(2) features the next highest performance, the fourth storage battery 120(4) features the lowest performance, and the third storage battery 120(3) features the next lowest performance.

Therefore, the operating costs of the storage battery control system 10 can be lowered by using the lowest performance storage battery 120 as much as possible to meet the requirements from the energy management system 30. Consequently, in this example, a case in which the requested charging-discharging rate is small, for example, is dealt with using the least expensive low-performance storage batteries 120(3) and 120(4), and a case in which the requested charging-discharging rate is large, is dealt with using the expensive high-performance storage batteries 120(1) and 120(2). In accordance with this, the high-performance storage batteries 120(1) and 120(2) are used as infrequently as possible, delaying deterioration.

Therefore, the allocation order of priority becomes the storage battery 120(4), the storage battery 120(3), the storage battery 120(2), and the storage battery 120(1), in that order. The lowest performance storage battery 120(4) is used on a priority basis, and the likelihood of using the highest performance storage battery 120(1) is reduced.

To make this easier to understand, in the example shown in a table T10 of FIG. 4, a case in which the energy management system 30 requires that 5 kWh of power be supplied to the power grid 41 over the next one hour period will be explained here.

In this case, first, the charging-discharging rate operation part 114 selects the storage battery 120(4), which has the highest order of priority, from among the four storage batteries 120(1) through 120(4), and allocates 1 kWh, which is the energy capable of being discharged over the next one hour, as the storage battery 120(4) discharging rate.

As a result of this, the unallocated discharging rate (the discharging rate required by the energy management system 30) becomes 4 kWh. Consequently, the charging-discharging rate operation part 114 selects the next highest priority storage battery 120(3), and allocates 3 kWh, which is the energy capable of being discharged over the next one hour period, as the storage battery 120(3) discharging rate.

As a result of this, the unallocated discharging rate becomes 1 kWh. Consequently, the charging-discharging rate operation part 114 selects the next highest priority storage battery 120(2). The storage battery 120(2) is able to discharge 4 kWh of energy over the next one hour period. However, since the unallocated discharging rate is 1 kWh, 1 kWh is allocated to the discharging rate of the storage battery 120(2).

As a result of this, the unallocated discharging rate becomes 0, and as such, the lowest priority storage battery 120(1) is not used. Thus, the control plan (control pattern) for determining how much of a charging-discharging rate is allocated to each storage battery 120 is decided individually like this (S13).

FIG. 8B shows the result when the above-described allocation has been completed. FIG. 8A is the state prior to allocation, and FIG. 8B is the state in a case where allocations have been executed.

The high-performance storage battery 120(1) does not change since discharging has not been instructed. Since a discharge of 1 kWh was allocated to the next highest performance storage battery 120(2), although the future discharging capability of the storage battery 120(2) is 4 kWh over the one hour period from the current time, this discharging capability becomes 3 kWh for the next one hour period. Alternatively, the charging capability of the storage battery 120(2) is 4 kWh for the one hour period from the current time, is 4 kWh for the subsequent one hour period, and becomes 1 kWh for the next one hour period after that.

Since a discharge of 3 kWh was allocated to the storage battery 120(3), the future discharging capability of the storage battery 120(3) makes it possible for the storage battery 120(3) to discharge 3 kWh each hour over a two hour period from the current time. Alternatively, the charging capability of the storage battery 120(3) makes it possible for the storage battery 120(3) to charge 3 kWh per hour over a four hour period from the current time.

Since a discharge of 1 kWh was allocated to the storage battery 120(4), the storage battery 120(4) is able to discharge 1 kWh per hour over a four hour period from the current time. The charging capability of the storage battery 120(4) makes it possible for the storage battery 120(4) to charge 1 kWh per hour over a six hour period from the current time.

Return to the flowchart of FIG. 2. The charging-discharging rate operation part 114 selects a control mode in accordance with the contents of the load prediction information acquired in Step S10 (S14).

In a case where the contents of the load prediction information is "load tends to maintain current state", the charging-discharging rate operation part 114 selects the storage battery control mode, which places priority on balancing the charging-discharging performance of the storage battery 120 (S15). In this example, this control mode is called the balanced mode.

In a case where the contents of the load prediction information is "load tends to increase", the charging-discharging rate operation part 114 selects the storage battery control mode, which places priority on the discharging performance of the storage battery 120 (S16). In this example, this control mode is called the discharging performance priority mode.

In a case where the contents of the load prediction information is "load tends to decrease", the charging-discharging rate operation part 114 selects the storage battery control mode, which places priority on the charging performance of the storage battery 120 (S17). In this example, this control mode is called the charging performance priority mode.

The charging-discharging rate operation part 114 creates a plan (control pattern) for controlling the charging and discharging of each storage battery 120 in accordance with the selected control mode.

As shown in FIG. 3, in the balanced mode (S15), the charging-discharging rate operation part 114 computes the SOC of each storage battery 120 based on the remaining capacity and the full charge capacity of each storage battery 120 acquired in Step S11 (S150). The result of the SOC computation is stored in the SOC C102 of the storage battery management DB 113 shown in FIG. 4.

Figure 9:
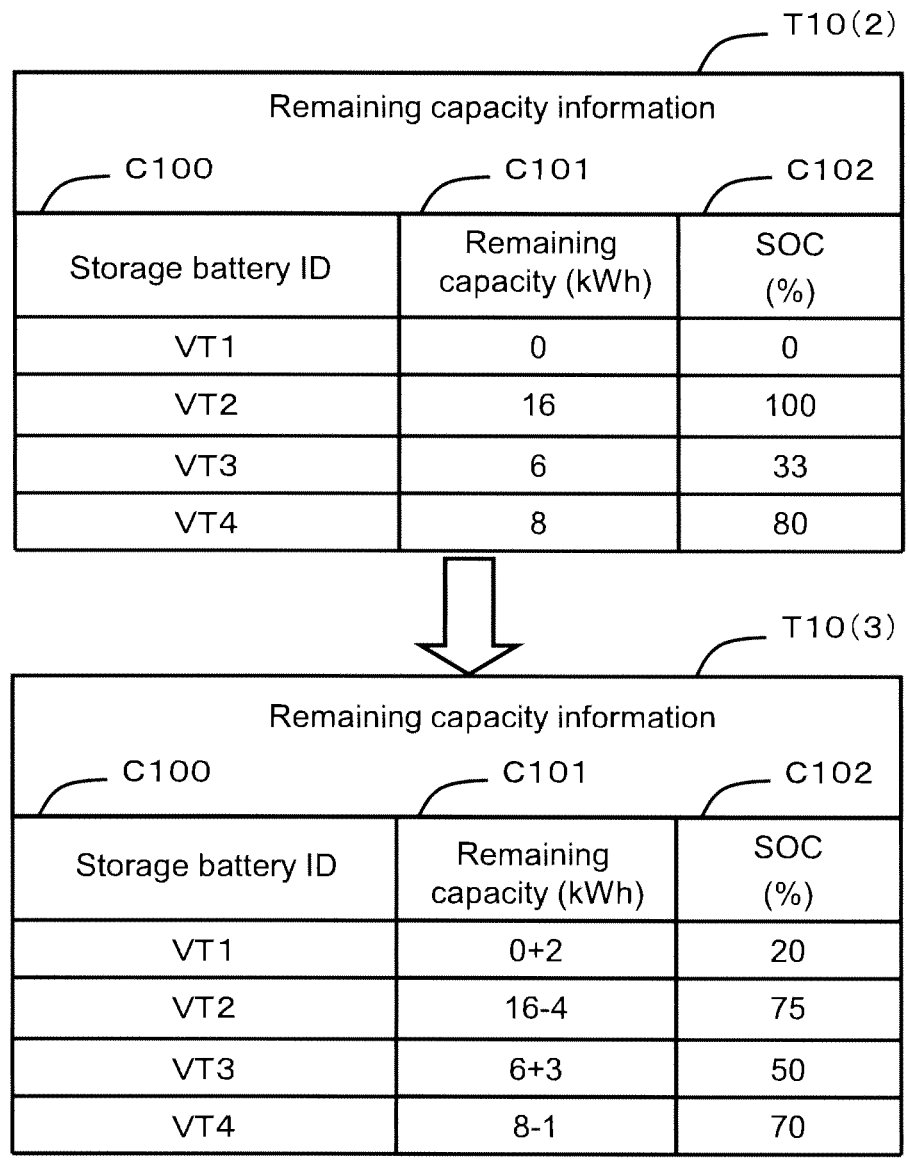
FIG. 9 shows changes in the remaining capacity information before and after executing a balanced mode control pattern.

Another example T10(2) of the remaining capacity information is shown at the top of FIG. 9. Upon referencing this remaining capacity information T10(2), the full charge capacity of the storage battery 120(1) is 10 kWh, but the remaining capacity is 0 kWh. Therefore, the SOC of the storage battery 120(1) is 0% ((0 kWh/10 kWh)×100=0%).

Figure 10:
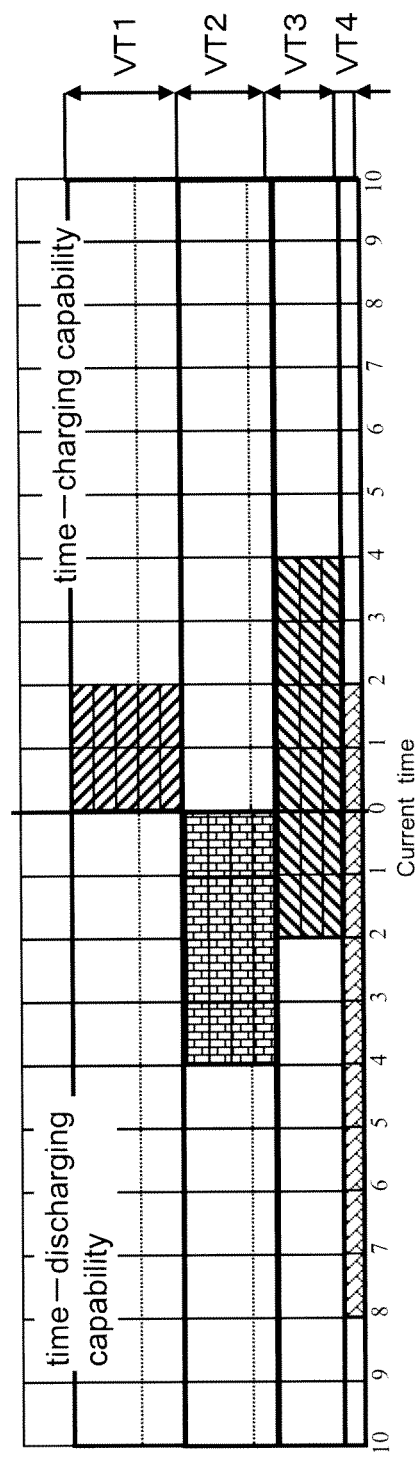
FIG. 10 is a graph showing changes over time in the charging-discharging performance prior to executing the balanced mode control pattern.

Upon carrying out the same computations therebelow, the SOC of the storage battery 120(2) is 100%, the SOC of the storage battery 120(3) is roughly 33%, and the SOC of the storage battery 120(4) is 80%. FIG. 10 displays the remaining capacity information T10(2) at the top of FIG. 9 in graph form.

The storage battery 120(1) is not charged at all, and as such, does not lose its discharging capability. However, because the remaining capacity of the storage battery 120(1) is 0 kWh, the storage battery 120(1) is able to accumulate surplus energy generated by the power grid 41 until this energy reaches 10 kWh, which is the full charge capacity.

The storage battery 120(2) is fully charged, and as such, cannot be charged any more, but is able to discharge until it has used up 16 kWh of energy, which is the full charge capacity. The explanations for the storage batteries 120(3) and 120(4) will be omitted.

Return to FIG. 9. The charging-discharging rate operation part 114 computes the charging-discharging rate required for the SOC of each storage battery 120 to reach 50%.

In the case of the remaining capacity information T10(2) shown at the top of FIG. 9, when the storage battery 120(1) is charged with 5 kWh, the SOC becomes 50%. When the storage battery 120(2) discharges 8 kWh, the SOC becomes 50%. When the storage battery 120(3) is charged just 3 kWh, the SOC becomes 50%. When the storage battery 120(4) discharges 3 kWh, the SOC becomes 50%.

As a balanced mode evaluation index, the sum of an absolute value of the charging-discharging rate required for the SOC of each storage battery 120 to become 50% is called "required charging-discharging rate" here. The required charging-discharging rate in the above-cited example is 19 kWh (=5+8+3+3).

Next, the charging-discharging rate operation part 114 computes the amount of energy capable of being charged and discharged in a one hour period from the current time from among the charging-discharging rates required for realizing a SOC of 50% (S151).

In the example of the remaining capacity information T10(2) of FIG. 9, the storage battery 120(1) must be charged 5 kWh to realize the SOC of 50%. Since the storage battery 120(1) can be charged 5 kWh in one hour, the required charging rate is 5 kWh.

Similarly, the storage battery 120(2) must discharge 8 kWh to realize the SOC of 50%. Since the storage battery 120(2) is able to discharge 4 kWh in one hour, the required discharging rate is 4 kWh.

Similarly, the storage battery 120(3) must be charged 3 kWh to realize the SOC of 50%. Since the storage battery 120(3) can be charged 3 kWh in one hour, the required charging rate is 3 kWh.

In the case of the storage battery 120(4), a discharge of 3 kWh is required for realizing the SOC of 50%. Since the storage battery 120(4) is able to discharge 1 kWh in one hour, the required discharging rate is 1 kWh.

The charging and discharging already allocated in Step S13 makes it necessary to implement the allocation of this Step S151. For example, in a case where a 5 kWh charge has been allocated to the storage battery 120(1) in Step S13, the charging-discharging capability of the storage battery 120(1) has already been exhausted, and as such, the amount of energy capable of being charged and discharged is 0 (Step S151).

That is, Step S13 of FIG. 2 is an allocation for handling the charging-discharging rate requested by the energy management system 30. Step S151 of FIG. 3 is an allocation for adjusting the remaining capacity of each storage battery 120 in accordance with a load fluctuation trend prediction in preparation for the next control cycle. The purpose of Steps S161 and S171, which will be explained further below, is the same as that of Step S151.

Thus, in this example, the charging and discharging of each storage battery 120 is individually controlled in accordance with the power supply-demand situation (S13), and the remaining capacity of each storage battery 120 is adjusted beforehand in accordance with a load trend prediction (S151). Therefore, as long as the load fluctuation trend prediction is not way off the mark, each storage battery 120 can be used rapidly and efficiently.

Return to the flowchart of FIG. 3. The charging-discharging rate operation part 114 matches the required charging-discharging rate of each storage battery 120 for a one hour period from the current time calculated in Step S151 (S152).

Match signifies allocating the energy discharged by one storage battery 120 to the charging of another storage battery 120.

That is, the charging-discharging rate operation part 114 combines the charging rate per hour required for realizing the SOC of 50% in a certain storage battery 120 with the discharging rate per hour required for realizing the SOC of 50% in another storage battery 120.

Matching also allocates energy in order from the storage battery having the lowest charging-discharging performance for the same reason as described using Step S13.

A matching process in a case where the requested charging-discharging rate is 0, and the load prediction information is "load tends to maintain current state" will be explained on the premise of the remaining capacity information T10(2) shown in FIG. 9.

The charging-discharging rate operation part 114 allocates 1 kWh of the 3 kWh charging rate of the storage battery 120(3) to the 1 kWh discharging rate of the storage battery 120(4). The charging-discharging rate operation part 114 allocates 2 kWh of the 4 kWh discharging rate of the storage battery 120(2) to the remaining 2 kWh charging rate of the storage battery 120(3). The charging-discharging rate operation part 114 allocates 2 kWh of the 5 kWh charging rate of the storage battery 120(1) to the remaining 2 kWh discharging rate of the storage battery 120(2). The 3 kWh charging rate remaining in the storage battery 120(1) constitutes energy, which could not be matched.

As a result of the above-described matching process, the control rate of the respective storage batteries 120 becomes a 2 kWh charge for the storage battery 120(1), a 4 kWh discharge for the storage battery 120(2), a 3 kWh charge for the storage battery 120(3), and a 1 kWh discharge for the storage battery 120(4).

Remaining capacity information T10(3) after the matching process is shown at the bottom of FIG. 9. The SOC of each storage battery 120 approaches closer to 50% than before the matching process was executed.

The required charging-discharging rates in the remaining capacity information T10(3) will be considered. Because the remaining capacity of the storage battery 120(1) is 2 kWh (=0+2) and the full charge capacity is 10 kWh, the charging rate required to realize a SOC of 50% is 3 kWh.

Because the remaining capacity of the storage battery 120(2) is 12 kWh (=16−4) and the full charge capacity is 16 kWh, the discharging rate required to realize a SOC of 50% is 4 kWh.

Because the remaining capacity of the storage battery 120(3) is 9 kWh (=6+3) and the full charge capacity is 18 kWh, the energy required to realize a SOC of 50% is 0.

Because the remaining capacity of the storage battery 120(4) is 7 kWh (=8−1) and the full charge capacity is 10 kWh, the discharging rate required to realize a SOC of 50% is 2 kWh.

When the charging-discharging rate operation part 114 computes the "required charging-discharging rate" described hereinabove, the result is 3+4+0+2=9, which is an improvement over the case of the remaining capacity information T10(2) shown in the top part of FIG. 9. The matching process may be executed using mathematical programming and the like to make the "required charging-discharging rate" index the objective function and reduce this index value even more.

Figure 11:
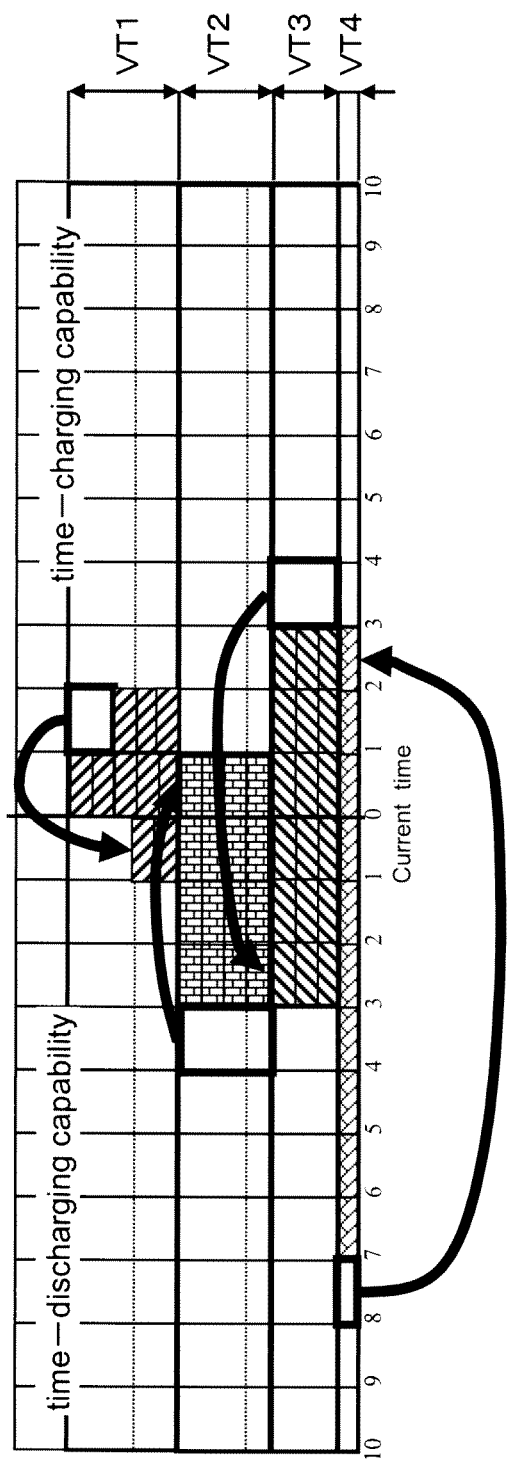
FIG. 11 is a graph showing changes over time in the charging-discharging performance after executing the balanced mode control pattern.

FIG. 11 is a graph showing the relationship between an elapsed time and the charging-discharging capability in the case of the remaining capacity information T10(3). The energy of a part enclosed in a black border in the drawing is being adjusted. That is, since the storage battery 120(1) charges 2 kWh, the discharging capability of the storage battery 120(1) increases by these 2 kWh. Since the storage battery 120(2) discharges 4 kWh, the charging capability of the storage battery 120(2) increases by these 4 kWh. Since the storage battery 120(3) charges 3 kWh, the discharging capability of the storage battery 120(3) increases by these 3 kWh. Since the storage battery 120(4) discharges 1 kWh, the charging capability of the storage battery 120(4) increases by this 1 kWh.

The discharging performance priority mode (S16) will be explained by returning to the flowchart of FIG. 3. In the discharging performance priority mode, the remaining capacity of each storage battery 120 is adjusted beforehand to maintain the discharge performance as high as possible for the storage batteries 120 as a whole.

Thus, the charging-discharging rate operation part 114 compares the discharging performance of the respective storage batteries 120 acquired in Step S11 of FIG. 2, and confirms the discharging performances in descending order (S160). In the example of FIG. 5, the discharging performance decreases in order from the storage battery 120(1), to the storage battery 120(2), the storage battery 120(3), and the storage battery 120(4).

The charging-discharging rate operation part 114 computes the charging-discharging capability for each storage battery 120 for each unit of time that elapses (Step S161).

The charging-discharging rate operation part 114 performs a charging-discharging rate matching process to realize a discharging performance priority state. The charging-discharging rate matching process for discharging performance priority is for distributing the remaining capacity of each storage battery 120 beforehand to enable the highest possible discharging performance to continue for the respective storage batteries 120 as a whole.

In this example, multiple storage batteries 120(1) through 120(4) are likened to a single virtual storage battery. Then, the storage battery control apparatus 110, in a case where the discharging performance priority mode is to be executed, individually controls the remaining capacity of each storage battery 120 comprising the virtual storage battery to make the discharging performance of the virtual storage battery as large as possible.

In the case shown in the charging-discharging performance information T20 of FIG. 5, first, the charging-discharging rate operation part 114 executes charging-discharging control between storage batteries 120 so as to be able to realize total discharging performance of 13 kWh over a period of one hour from the current time. When remaining capacity is still available, charging and discharging is performed between storage batteries 120 to be able to realize discharging performance totaling 13 kWh for a second hour. When remaining capacity is still available, charging and discharging is performed between storage batteries 120 to have discharging performance totaling 8 kWh for a third hour. The fact that the total discharging performance for the third hour becomes 8 kWh assumes a case in which the remaining capacity of the first storage battery 120(1) has become 0.

In the case of the remaining capacity information T10(2) shown in the top part of FIG. 9, the change in the charging-discharging capability over time is as shown in the graph of FIG. 10. According to the FIG. 10 graph, the first hour discharging capability of the respective storage batteries 120 is 0 kWh for the storage battery 120(1), 4 kWh for the storage battery 120(2), 3 kWh for the storage battery 120(3), and 1 kWh for the storage battery 120(4). Consequently, the charging of the storage battery 120(1) is considered.

The discharging capability of the storage battery 120(4) for the second hour is 1 kWh, the discharging capability of the storage battery 120(3) for the second hour is 3 kWh, and the discharging capability of the storage battery 120(2) for the second hour is 4 kWh. Therefore, 5 kWh, which is the total of the 1 kWh discharging rate from the low discharging performance storage battery 120(4), the 3 kWh discharging rate from storage battery 120(3), and the 1 kWh discharging rate from storage battery 120(2), is charged to the storage battery 120(1).

Figure 13:
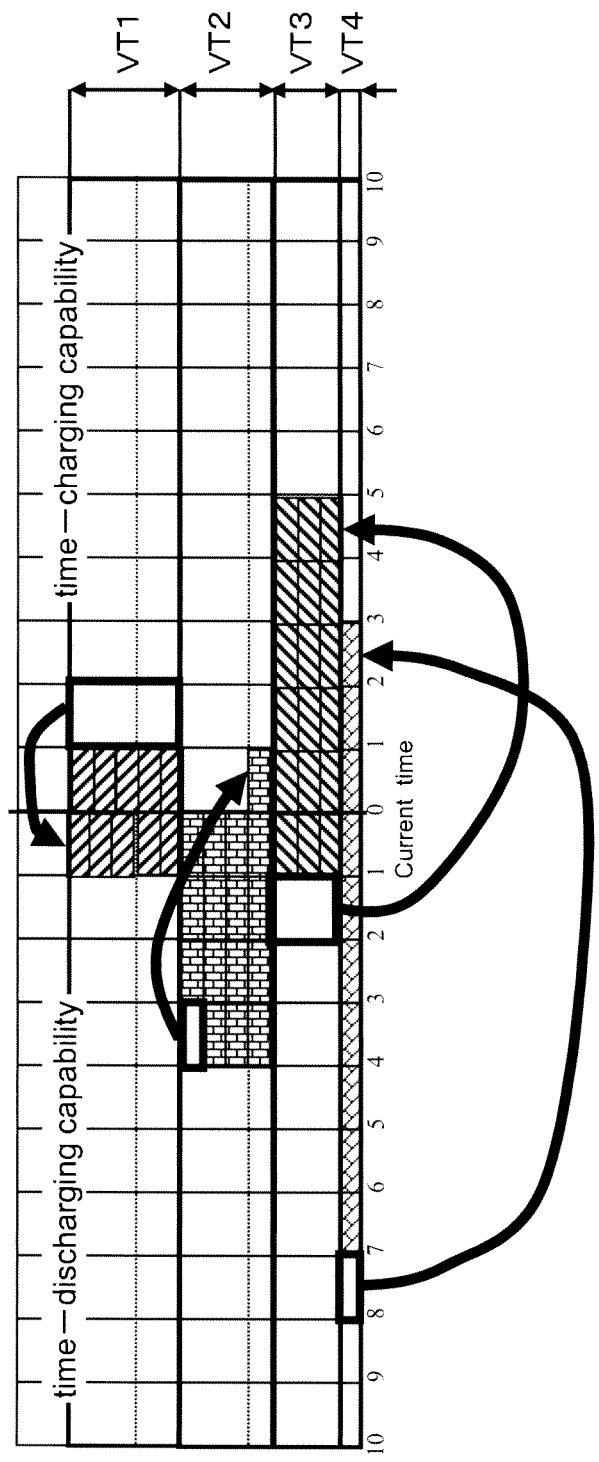
FIG. 13 is a graph showing changes over time in the charging-discharging performance after executing the discharging performance priority mode control pattern.

FIG. 12 shows remaining capacity information T10(4) in a case where the discharging performance priority mode has been implemented. FIG. 13 shows a time-charging/discharging capabilities graph in a case where the discharging performance priority mode has been implemented. Consequently, the energy of a part enclosed in a black border in FIG. 13 is moved in accordance with the 5 kWh of energy discharged from the storage batteries 120(2) through 120(4) to the storage battery 120(1) (5162).

The 1 kWh-worth of discharging capability from the storage battery 120(4) is lost in accordance with the 1 kWh from the storage battery 120(4) being charged to the storage battery 120(1) as shown in the black-border parts in FIG. 13. Alternatively, the storage battery 120(4) obtains 1 kWh-worth of charging capability as shown by the arrow extending from the black-border part.

Similarly, the 3 kWh-worth of discharging capability from the storage battery 120(3) is lost in accordance with the 3 kWh from the storage battery 120(3) being charged to the storage battery 120(1). Alternatively, the storage battery 120(3) obtains 3 kWh-worth of charging capability as shown by the arrow.

Similarly, the 1 kWh-worth of discharging capability from the storage battery 120(2) is lost in accordance with the 1 kWh from the storage battery 120(2) being charged to the storage battery 120(1). Alternatively, the storage battery 120(2) obtains 1 kWh-worth of charging capability as shown by the arrow.

As a result, a total of 5 kWh of energy is charged to the storage battery 120(1) in a one-hour period from the current time. Therefore, instead of losing 5 kWh-worth of charging capability as shown in the black-border part, the storage battery 120(1) obtains 5 kWh-worth of discharging capability as shown by the arrow.

The charging performance priority mode (S17) will be explained by returning to FIG. 3. In the charging performance priority mode, the remaining capacity of each storage battery 120 is adjusted beforehand to maintain the highest possible charging performance in the storage batteries 120 as a whole.

Thus, the charging-discharging rate operation part 114 compares the charging performance of the respective storage batteries 120 acquired in Step S11 of FIG. 2, and confirms the charging performances in descending order (S170). In the example of FIG. 5, the charging performance decreases in order from the storage battery 120(1), to the storage battery 120(2), the storage battery 120(3), and the storage battery 120(4).

The charging-discharging rate operation part 114 computes the charging-discharging capability for each storage battery 120 for each unit of time that elapses (Step S171).

The charging-discharging rate operation part 114 performs a charging-discharging rate matching process to realize a charging performance priority state (S172).

The charging-discharging rate matching process for charging performance priority is for distributing the remaining capacity of each storage battery 120 so that the highest possible charging performance will continue.

In the case of the charging-discharging performance information T20 of FIG. 5, first, charging-discharging control is performed between the storage batteries 120 to realize a total charging performance of 13 kWh during the first hour from the current time. When remaining capacity is still available, charging and discharging is performed between the storage batteries 120 so as to be able to maintain charging performance totaling 13 kWh for a second hour. When remaining capacity is still available, charging and discharging is performed between the storage batteries 120 to have charging performance totaling 8 kWh for a third hour.

In the case of the remaining capacity information T10(2) shown at the top of FIG. 9, as described hereinabove, the charging-discharging capability over time is as shown in FIG. 10.

According to FIG. 10, the first-hour charging capability of the respective storage batteries is 5 kWh for the storage battery 120(1), 0 kWh for the storage battery 120(2), 3 kWh for the storage battery 120(3), and 1 kWh for the storage battery 120(4). Consequently, a discharge from the storage battery 120(2) is considered.

The charging capability of the storage battery 120(4) for the second hour is 1 kWh, the charging capability of the storage battery 120(3) for the second hour is 3 kWh, and the discharging capability of the storage battery 120(1) for the second hour is 5 kWh. Therefore, 1 kWh is charged to the storage battery 120(4), which has the lowest charging performance, and 3 kWh is charged to the storage battery 120(3), which has the next lowest charging performance, by discharging of 4 kWh of energy from the storage battery 120(2).

Figure 15:
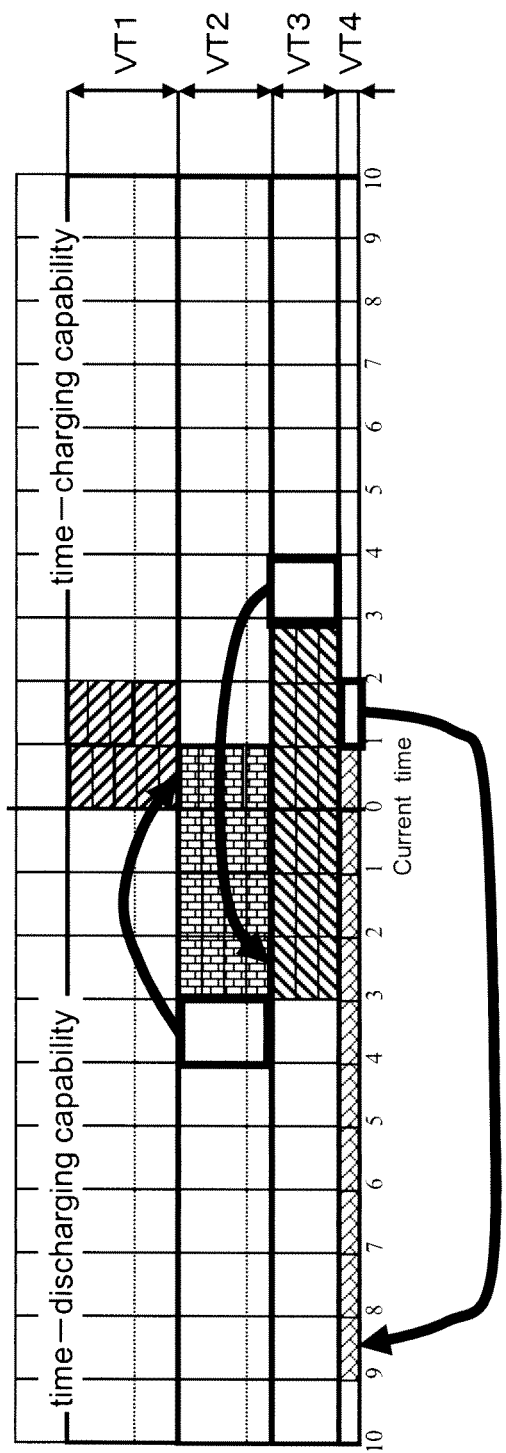
FIG. 15 is a graph showing changes over time in the charging-discharging performance after executing the charging performance priority mode control pattern.

FIG. 14 shows remaining capacity information T10(5) in a case where the charging performance priority mode has been implemented. FIG. 15 is a graph showing the relationship between an elapsed time and the charging-discharging capability in a case where the charging performance priority mode has been implemented. The energy of the black-border parts in FIG. 15 is being moved (S172).

Return to FIG. 2. The charging-discharging rate operation part 114 notifies the control part 123 of each storage battery 120 of the control rate (charging-discharging rate) of each storage battery after the control mode of any of Steps S15 through S17 has been executed (S18). The control rate of each storage battery, as described hereinabove, is decided in any of Step S152, Step S162, or Step S172.

The charging-discharging rate operation part 114, after notifying the control part 123 of each storage battery 120 of the control rate, waits for a prescribed control cycle (S19), and returns once again to Step S10.

This example, being configured as described hereinabove, achieves the following effects. In this example, the storage battery control apparatus 110 can handle multiple storage batteries 120 just like a single virtual storage battery. Then, this example controls the remaining capacity of each storage battery 120 so as to be able to deal with a power supply-demand prediction. Therefore, in this example, it is possible to systematically adjust the remaining capacity of each storage battery 120 and to make effective use of each storage battery 120, thereby making it possible to operate the power grid stably and efficiently.

This example predicts which of the balanced mode, the discharging performance priority mode, or the charging performance priority mode is the relevant control mode, and adjusts the remaining capacity of each storage battery 120 beforehand in accordance with the predicted control mode. Therefore, it is possible to quickly deal with fluctuations in power demand.

In this example, since the storage batteries 120 are used in ascending order of charging-discharging performance, it is possible to curb the deterioration of an expensive storage battery, enabling system operating costs to be reduced.

Example 2

Example 2 will be explained by referring to FIG. 16. Each of the following examples, to include this example, is equivalent to a variation of Example 1. Therefore, the explanations will focus on the differences with Example 1. In this example, one of multiple storage batteries 120 is used as a spare storage battery.

Figure 16:
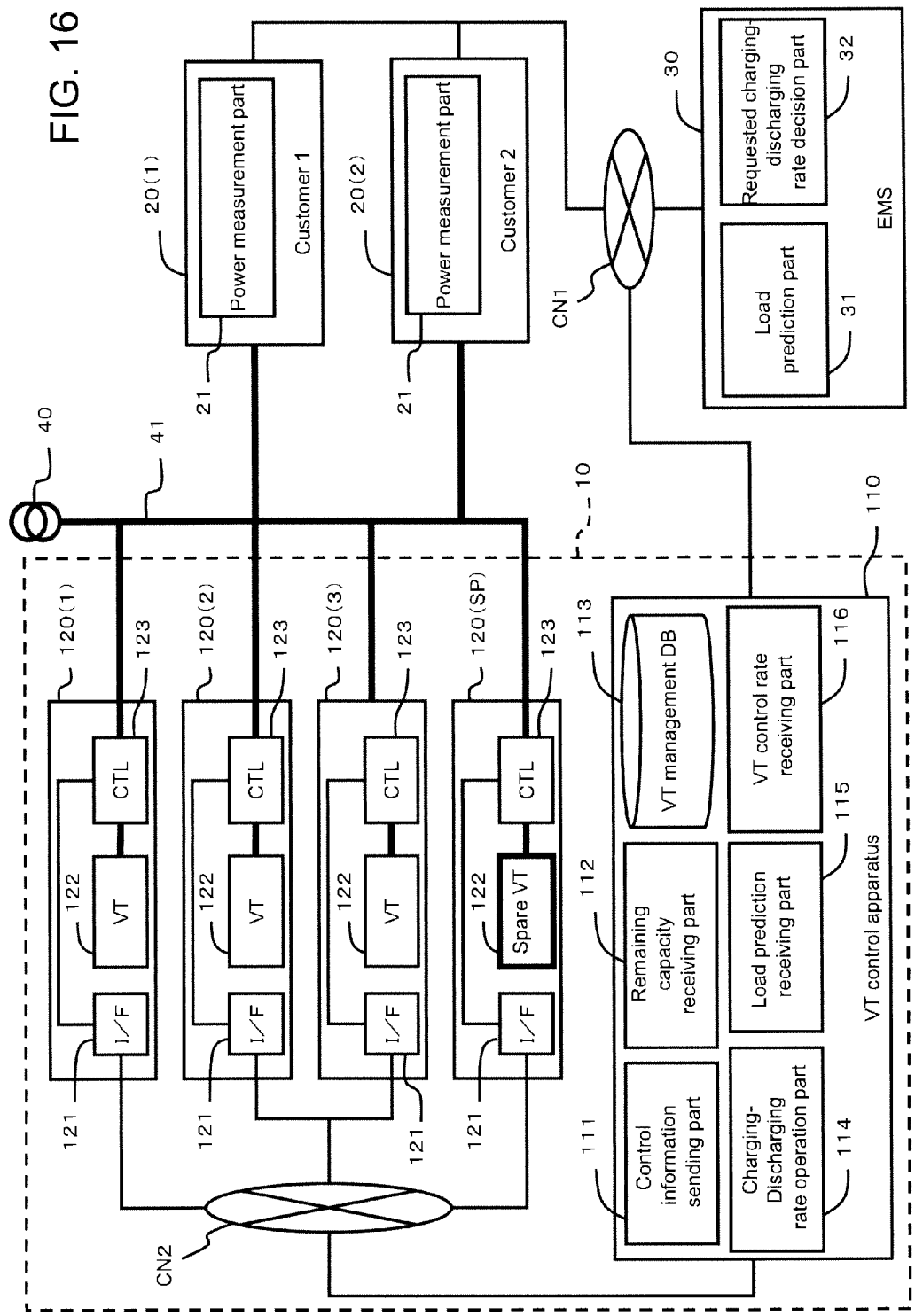
FIG. 16 is a block diagram of an entire storage battery control system related to Example 2.

FIG. 16 shows the overall configuration of a storage battery control system 10 according to this example. The storage battery control system 10 comprises multiple storage batteries 120(1), 120(2), 120(3), and 120(SP), and these storage batteries are coupled to a storage battery control apparatus 110.

The storage batteries 120(1) through 120(3) are used as normal storage batteries. The storage battery 120(SP) is used as a spare storage battery, and is not used at normal times. In FIG. 16, three normal storage batteries 120(1) through 120(3) and only one spare storage battery 120(SP) are shown, but the numbers are not limited thereto.

In a case where any of the normal storage batteries 120(1) through 120(3) stops functioning due to maintenance or the like, the spare storage battery 120(SP) is used in place of the storage battery targeted for maintenance.

Being configured like this, this example also achieves the same effects as Example 1. In addition, this example comprises a spare storage battery 120(SP). Therefore, it is possible to use multiple storage batteries efficiently and to stabilize control of the power grid 41 even in a case where normal storage batteries 120(1) through 120(3) have stopped functioning as a result of maintenance or the like.

Instead of providing a spare storage battery 120(SP), for example, the electricity bill can be raised temporarily during maintenance. This will make it possible to reduce the power consumption of the customers 20 while the storage battery 120 is undergoing maintenance.

Example 3

Example 3 will be explained by referring to FIG. 17. This example uses a storage battery mounted in an electric vehicle 120A.

Figure 17:
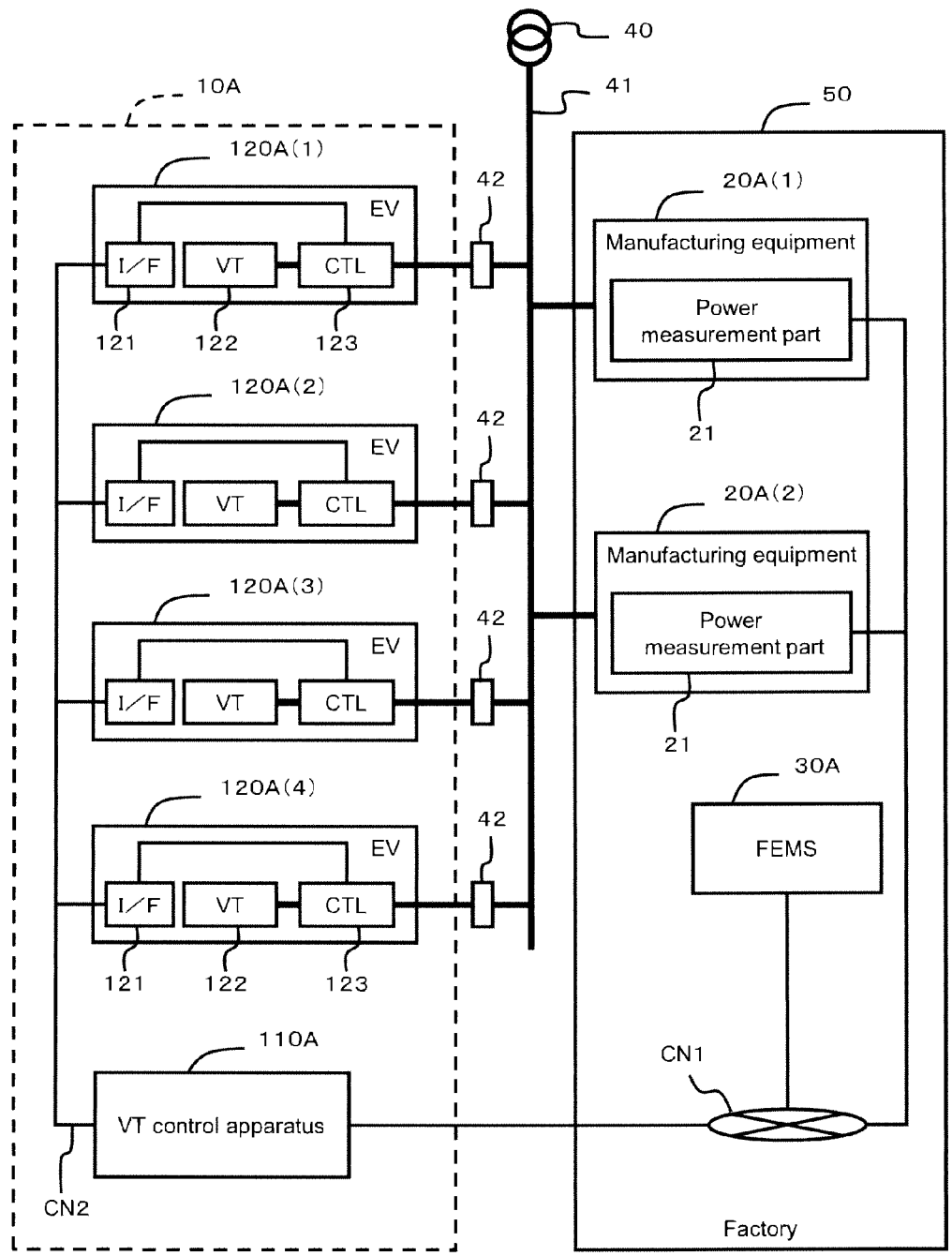
FIG. 17 is a block diagram of an entire storage battery control system related to Example 3.

FIG. 17 is an overall block diagram of a power control system comprising a storage battery control system 10A according to this example. A factory 50 comprises multiple pieces of manufacturing equipment 20A(1) and 20A(2), and an energy management system (Factory Energy Management System) 30A.

The manufacturing equipment 20A(1) and 20A(2) correspond to the customers 20 of Example 1. Each piece of manufacturing equipment 20A(1) and 20A(2) comprises a power measurement part 21. The factory energy management system 30A corresponds to the energy management system 30 of Example 1. Although omitted from the drawing, the factory energy management system 30A comprises a load prediction part 31 and a requested charging-discharging rate decision part 32.

The storage battery control system 10A comprises multiple electric vehicles 120A(1) through 120A(4), and a storage battery control apparatus 110A. Each electric vehicle 120A is coupled to the factory power grid 41 via an electric plug 42. Each electric vehicle 120A corresponds to a storage battery 120 of Example 1, and comprises a communication part 121, a storage battery main unit 122, and a control part 123.

A worker travels to the factory 50 by riding in either an electric vehicle 120A he owns himself, or an electric vehicle 120A lent out by the company. Multiple electric plugs 42 are installed in the factory 50 parking lot. Each electric vehicle 120A is electrically coupled to the factory 50 power grid 41 via an electric plug 42.

Thereafter, the storage battery of the electric vehicle 120A is controlled and the power grid 41 stabilized in accordance with the power demands inside the factory 50 the same as described in Example 1. This example may be combined with a stationary-type storage battery.

Being configured like this, this example also achieves the same effects as Example 1. In addition, in this example, it is possible to make effective use a storage battery of an electric vehicle 120A. The example of a factory 50 was used in the explanation, but the venue is not limited to a factory, and, for example, the present invention can be applied to an office building, a multi-unit housing complex, a hospital, municipal offices, and so forth.

Example 4

Figure 18:
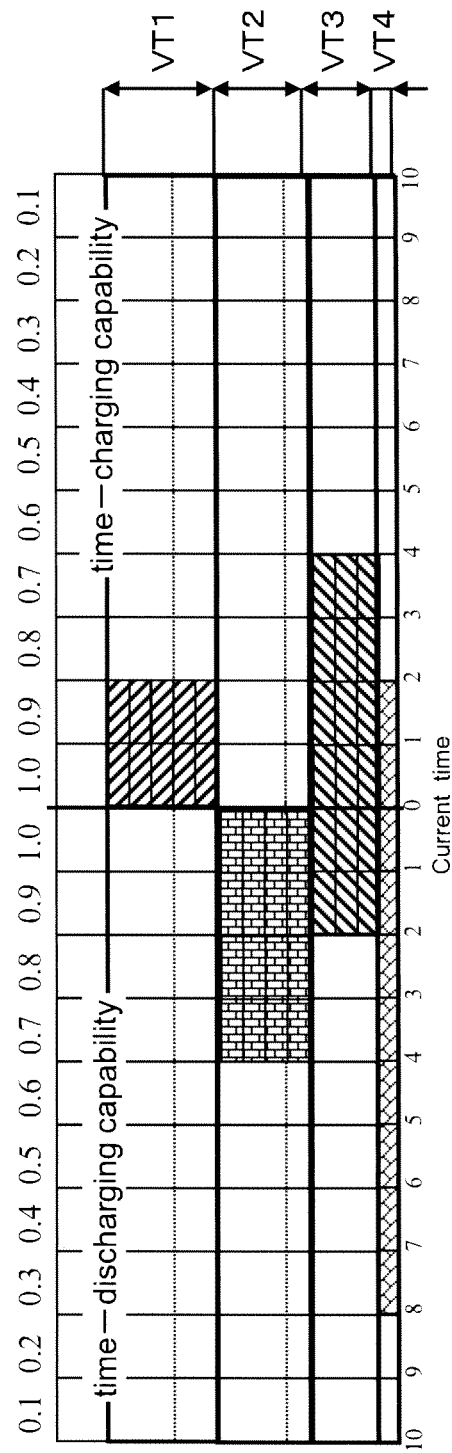
FIG. 18 is a graph related to Example 4 showing changes over time in charging-discharging performance.

Example 4 will be explained by referring to FIG. 18. This example decides a control pattern based on a total value of the time required for charging and discharging.

It is possible for there to exist multiple control patterns for adjusting the remaining capacity in accordance with the balanced mode, the discharging performance priority mode, and the charging performance priority mode. In Example 1, the use of storage batteries 120 in ascending order from that with the lowest charging-discharging performance is given as one selection criterion.

In contrast to this, the focus in this example is on responsiveness. In this example, as shown in the graph of FIG. 18, an evaluation score is configured such that the longer the time lapse from the current time, the lower the score in a time slot of the elapsed time from the current time. For example, the further behind the current time the elapsed time is, the smaller the evaluation score becomes, such as a score of 1 in the time slot for one hour or less from the current time, and a score of 0.9 in the time slot for an elapsed time of two hours from the current time.

The storage battery control apparatus 110, when deciding on a charging-discharging control pattern for each of the respective storage batteries 120 for adapting to the balanced mode, the discharging performance priority mode, or the charging performance priority mode, selects a control pattern having the lowest total evaluation score from among multiple candidates. Therefore, this example also achieves the same effects as Example 1. In addition, in this example, it is possible to enhance the response performance of the storage batteries 120 as a whole, and to rapidly deal with sudden fluctuations in power supply and demand.

Example 5

Example 5 will be explained by referring to FIG. 19. In this example, the remaining capacity of a storage battery 120 near a customer 20 is allocated in response to the power consumed by this customer 20.

Figure 19:
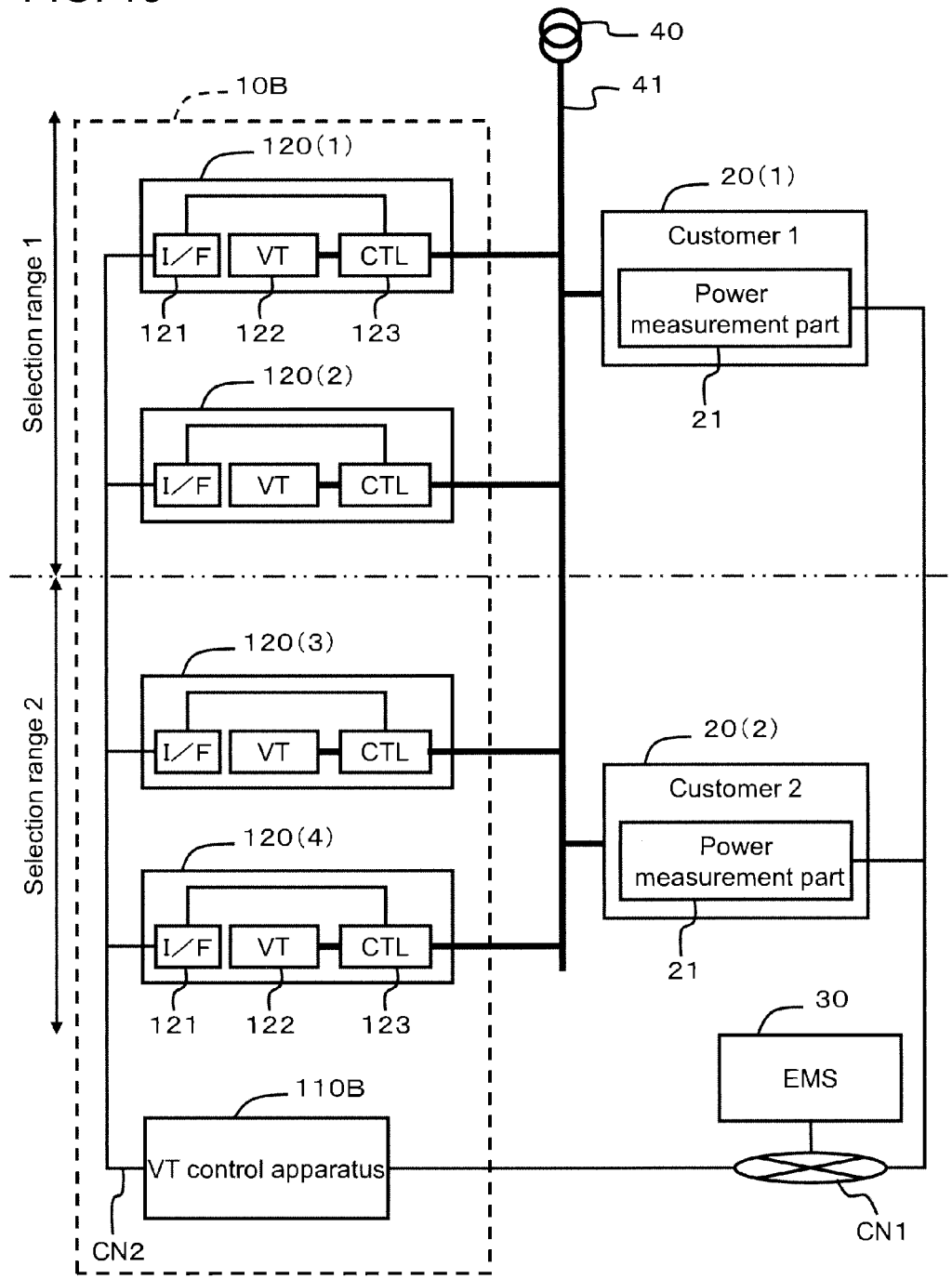
FIG. 19 is a block diagram of an entire storage battery control system related to Example 5.

FIG. 19 shows the overall configuration of a power control system comprising a storage battery control system 10B according to this example. A storage battery 120 is allocated ahead of time in accordance with the location of each customer 20(1) and 20(2). The storage battery 120(1) and the storage battery 120(2) are allocated to the one customer 20(1). The storage battery 120(1) and the storage battery 120(2) comprise a first storage battery group. The storage battery 120(3) and the storage battery 120(4) are allocated to the other customer 20(2). The storage battery 120(3) and the storage battery 120(4) comprise a second storage battery group.

It is supposed here that the storage battery 120(1) is higher performance than the storage battery 120(2), and that the storage battery 120(3) is higher performance than the storage battery 120(4). The superiority or inferiority of the performance of the storage battery 120(1) and the storage battery 120(3), and the superiority or inferiority of the performance of the storage battery 120(2) and the storage battery 120(4) do not particularly matter.

The storage battery control apparatus 110B utilizes the charging and the discharging of the storage batteries 120(1) and 120(2) of the first storage battery group to meet the power demands of the customer 20(1). Similarly, the storage battery control apparatus 110B utilizes the charging and the discharging of the storage batteries 120(3) and 120(4) of the second storage battery group to meet the power demands of the customer 20(2).

That is, in this example, the configurations shown as selection range 1 and selection range 2 respectively comprise virtual storage batteries. Each virtual storage battery is associated with a prescribed customer 20, who is a short distance away in terms of the electric power supply.

The storage battery control apparatus 110B, when deciding from among the above-mentioned multiple control patterns, selects a control pattern having the smallest total value of the distance over which power is supplied to the customer. This makes it possible to stabilize the power supply and demand of the power grid 41 more efficiently because it enables the transmission distance to be shortened and voltage drops to be reduced.

The present invention is not limited to the examples described hereinabove. A person having ordinary skill in the art will be able to make various additions and changes without departing from the scope of the present invention. For example, the configuration may be such that the control pattern is selected on the basis of the cost of the storage battery.

The present invention, for example, can also be expressed as a computer program invention as follows.

A computer program for controlling, using a computer, the operation of a storage battery coupled to a power grid, the computer program causing the computer to:

acquire storage battery information comprising a charging-discharging performance and a remaining capacity from multiple storage batteries coupled to the power grid;

acquire power supply-demand prediction information showing a prediction of power supply and demand in a prescribed range from an energy management system for managing the power supply and demand in the prescribed range;

decide an individual charging-discharging rate for each of the above-mentioned storage batteries based on the above-mentioned storage battery information and the above-mentioned power supply-demand prediction information; and send the decided individual charging-discharging rate to each storage battery, and operate the above-mentioned each storage battery based on the above-mentioned individual charging-discharging rate received from a storage battery control apparatus.

What is claimed is:

1. A storage battery control system for controlling an operation of a storage battery coupled to a power grid, comprising:

multiple storage batteries disposed in a power grid; and a storage battery control apparatus configured to control a charging and a discharging of the multiple storage batteries, and communicably coupled to the multiple storage batteries and an energy management system, wherein the storage battery control apparatus is configured to:

acquire storage battery information comprising a charging-discharging performance and a remaining capacity from the storage batteries;

acquire power supply-demand prediction information showing a prediction of power supply and demand in a prescribed range from the energy management system, which manages the power supply and demand in the prescribed range;

determine, based on the power supply-demand prediction information received from the energy management system, whether a mode is a balanced mode in which a power demand and a power supply are in balance, a discharging performance priority mode in which the power demand is greater than the power supply, or a charging performance priority mode in which the power supply is greater than the power demand;

select, as a control pattern, in a case of the balanced mode, a balanced control pattern for deciding on the individual charging-discharging rate so as to allow the remaining capacity of each of the storage batteries to approach half of the full charge capacity of the relevant storage battery;

select, as the control pattern, in a case of the discharging performance priority mode, a discharging control pattern for deciding on the individual charging-discharging rate that allows charging from a low-discharging-performance storage battery of the storage batteries to a high-discharging-performance storage battery of the storage batteries; and select, as the control pattern, in a case of the charging performance priority mode, a charging control pattern for deciding on the individual charging-discharging rate that allows charging from a high-charging-performance storage battery of the storage batteries to a low-charging-performance storage battery of the storage batteries decide an individual charging-discharging rate for each of the storage batteries based on the control pattern; and send the individual charging-discharging rate to each of the storage batteries, and each of the storage batteries is configured to operate based on the individual charging-discharging rate received from the storage battery control apparatus.

2. The storage battery control system according to claim 1, wherein the charging-discharging performance comprises a charging performance showing a charging rate per unit of time, a discharging performance showing a discharging rate per unit of time, and a full charge capacity.

3. The storage battery control system according to claim 2, wherein:

the energy management system is configured to:

predict a power demand in the prescribed range in a prescribed time period, which is configured longer than the unit of time, based on a power consumption of a customer, who exists within the prescribed range; and calculate a total charging-discharging rate requested for the storage batteries as a whole based on the predicted power demand, and the energy management system includes the calculated total charging-discharging rate in the power supply-demand prediction information, and sends this information to the storage battery control apparatus.

4. The storage battery control system according to claim 3, wherein the energy management system is configured to calculate load prediction information showing a trend of a change in the power demand based on the predicted power demand, and the energy management system includes the calculated load prediction information in the power supply-demand prediction information, and sends this information to the storage battery control apparatus.

5. The storage battery control system according to claim 1, wherein, in a case where there exists multiple candidates for the control pattern, the storage battery control apparatus is configured to select any one of the candidates as the control pattern based on a preconfigured prescribed selection criterion.

6. The storage battery control system according to claim 5, wherein the prescribed selection criterion is used to select, from among the multiple candidates, a candidate having the shortest total value for a distance between a customer and the storage battery that supplies power to the customer.

7. The storage battery control system according to claim 5, wherein the prescribed selection criterion is used to select, from among the multiple candidates, a candidate having the shortest total value for a time required for charging and discharging power.

8. The storage battery control system according to claim 1, wherein the power supply and demand in the prescribed range is power supply and demand in a low voltage-side grid of a distribution substation.

9. The storage battery control system according to claim 1, wherein the power supply and demand in the prescribed range is power supply and demand in a low voltage-side grid of a pole transformer.

10. The storage battery control system according to claim 1, wherein the power supply and demand in the prescribed range is power supply and demand in electrical equipment of a customer.

11. The storage battery control system according to claim 1, wherein the multiple storage batteries are respectively mounted in different electric vehicles.

12. A storage battery control method for controlling an operation of a storage battery coupled to a power grid, comprising the steps, to be performed by a processor, of:

acquiring storage battery information comprising a charging-discharging performance and a remaining capacity from multiple storage batteries coupled to a power grid;

acquiring power supply-demand prediction information showing a prediction of power supply and demand in a prescribed range from an energy management system, which manages the power supply and demand in the prescribed range;

determining, based on the power supply-demand prediction information received from the energy management system, whether a mode is a balanced mode in which a power demand and a power supply are in balance, a discharging performance priority mode in which the power demand is greater than the power supply, or a charging performance priority mode in which the power supply is greater than the power demand;

selecting, as a control pattern, in a case of the balanced mode, a balanced control pattern for deciding on the individual charging-discharging rate so as to allow the remaining capacity of each of the storage batteries to approach half of the full charge capacity of the relevant storage battery;

selecting, as the control pattern, in a case of the discharging performance priority mode, a discharging control pattern for deciding on the individual charging-discharging rate that allows charging from a low-discharging-performance storage battery of the storage batteries to a high-discharging-performance storage battery of the storage batteries; and selecting, as the control pattern, in a case of the charging performance priority mode, a charging control pattern for deciding on the individual charging-discharging rate that allows charging from a high-charging-performance storage battery of the storage batteries to a low-charging-performance storage battery of the storage batteries deciding an individual charging-discharging rate for each of the storage batteries based on the control pattern;

sending the individual charging-discharging rate to each of the storage batteries; and operating each of the storage batteries based on the individual charging-discharging rate received from a storage battery control apparatus.

\* \* \* \* \*